(12) United States Patent
Zong et al.

(10) Patent No.: US 11,463,921 B2
(45) Date of Patent: Oct. 4, 2022

(54) POLICY CONTROL METHOD, APPARATUS, AND SYSTEM

(71) Applicant: Huawei Technologies Co., Ltd., Shenzhen (CN)

(72) Inventors: Zaifeng Zong, Nanjing (CN); Shufeng Shi, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/009,212

(22) Filed: Sep. 1, 2020

(65) Prior Publication Data
US 2020/0396649 A1 Dec. 17, 2020

Related U.S. Application Data

(63) Continuation of application No. PCT/CN2019/077507, filed on Mar. 8, 2019.

(30) Foreign Application Priority Data

May 16, 2018 (CN) .......................... 201810469248.0

(51) Int. Cl.
*H04L 12/24* (2006.01)
*H04W 48/14* (2009.01)
(Continued)

(52) U.S. Cl.
CPC ......... *H04W 36/0033* (2013.01); *H04W 8/08* (2013.01); *H04W 48/08* (2013.01); *H04W 60/04* (2013.01)

(58) Field of Classification Search
None
See application file for complete search history.

(56) References Cited

U.S. PATENT DOCUMENTS

| 2015/0156122 | A1 | 6/2015 | Singh et al. |
| 2020/0154389 | A1* | 5/2020 | Karampatsis ........... H04L 63/20 |

FOREIGN PATENT DOCUMENTS

CN 101426243 A 5/2009

OTHER PUBLICATIONS

ZTE,"TS23.502 Clarification on Access and mobility related policy",SA WG2 Meeting #127 S2-184210,Apr. 16-20, 2018, Sanya, China,Total 13 Pages.

(Continued)

*Primary Examiner* — Gary Lafontant
(74) *Attorney, Agent, or Firm* — Conley Rose, P.C.

(57) ABSTRACT

A policy control method includes receiving, by a policy control network element, an update request message carrying information about a first mobility management network element from the first mobility management network element, updating, by the policy control network element according to the update request message, information about a second mobility management network element in information of a policy association corresponding to a terminal that is stored in the policy control network element to information about the first mobility management network element. The policy control network updates the information about the second mobility management network element in the information of the policy association to the information about the first mobility management network element instead of deleting the policy association and re-establishing a policy association with the first mobility management network element.

24 Claims, 8 Drawing Sheets

(51) Int. Cl.
*H04W 36/00* (2009.01)
*H04W 8/08* (2009.01)
*H04W 48/08* (2009.01)
*H04W 60/04* (2009.01)

(56) References Cited

OTHER PUBLICATIONS

Ericsson,"SMF dynamically allocated subscription data",3GPP TSG-SA WG2 Meeting #125 S2-180471,Gothenburg, Sweden, Jan. 22-26, 2018,Total 10 Pages.
3GPP TS 23.502 V15.1.0 "3rd Generation Partnership Project;Technical Specification Group Services and System Aspects;Procedures for the 5G System;Stage 2(Release 15)," Mar. 2018, 285 pages.
3GPP TS 29.507 V0.4.0, "3rd Generation Partnership Project; Technical Specification Group Core Network and Terminals; 5G System; Access and Mobility Policy Control Service; Stage 3 (Release 15)," Apr. 2018, 26 pages.
3GPP TS 29.518 V1.1.0, "3rd Generation Partnership Project; Technical Specification Group Core Network and Terminals; 5G System; Access and Mobility Management Services; Stage 3 (Release 15)," Apr. 2018, 116 pages.
S2-182630, Ericsson, "Alignment of terminology and general cleanup," 3GPP TSG-SA WG2 Meeting #126, Feb. 26-Mar. 2, 2018, Montreal, Canada, 103 pages.
S2-183541, Ericsson, "Terminology cleanup," 3GPP TSG-SA2 Meeting #127, Apr. 16-20, 2018, Sanya, China, 47 pages.
C3-183120, Nokia et al., "Supporting AMF Changes," 3GPP TSG-CT WG3 Meeting #97, Osaka, Japan, May 21-May 25, 2018, 9 pages.

* cited by examiner

POLICY CONTROL METHOD, APPARATUS, AND SYSTEM

CROSS-REFERENCE TO RELATED APPLICATIONS

This application is a continuation of International Patent Application No. PCT/CN2019/077507, filed on Mar. 8, 2019, which claims priority to Chinese Patent Application No. 201810469248.0, filed on May 16, 2018. The disclosures of the aforementioned applications are hereby incorporated by reference in their entireties.

TECHNICAL FIELD

This application relates to the field of mobile communications technologies, and in particular, to a policy control method, an apparatus, and a system.

BACKGROUND

In a 5th generation (5G) system, an access and mobility management function (AMF) network element may interact with a policy control function (PCF) network element, to obtain a terminal policy and an access and mobility management policy. In addition, when a terminal is registering with the network, the AMF network element establishes a policy association with the PCF network, and the PCF network element provides a policy to the AMF through the policy association.

In an AMF reselection scenario, an AMF network element selected before the reselection is referred to as an old AMF, and a reselected AMF network element is referred to as a new AMF. During AMF reselection, when the new AMF and the old AMF resides in one public land mobile network (PLMN), the new AMF requests an old PCF for establishment of a policy association, where the old PCF is a PCF network element that has established a policy association with the old AMF. After receiving the request from the new AMF for establishment of a policy association, the old PCF establishes a policy association between the old PCF and the new AMF, and then needs to delete the policy association with the old AMF, wasting resources of the PCF network element.

SUMMARY

This application provides a policy control method, an apparatus, and a system, to reduce resource overheads of a policy control network element in mobility management network element reselection scenarios.

According to a first aspect, this application provides a policy control method. The method includes receiving, by a policy control network element, an update request message from a first mobility management network element, where the update request message includes information about the first mobility management network element, and then updating, by the policy control network element according to the update request message, information about a second mobility management network element in information of a policy association corresponding to a terminal to the information about the first mobility management network element. Based on this solution, in a mobility management network element reselection scenario, the first mobility management network element is a reselected mobility management network element, the second mobility management network element is a mobility management network element selected before the reselection, and the policy control network element is a policy control network element that has established a policy association with the second mobility management network element. After the policy control network element receives the update request message from the first mobility management network element, the policy control network element can update, according to the update request message, the information about the second mobility management network element in the information of the policy association corresponding to the terminal that is stored in the policy control network element to the information about the first mobility management network element, where the information about the first mobility management network element is carried in the update request message. The policy control network element does not need to re-establish a policy association with the first mobility management network element after deleting the information about the second mobility management network element in the information of the policy association corresponding to the terminal. Instead, the policy control network element directly updates the information about the second mobility management network element in the information of the policy association corresponding to the terminal to the information about the first mobility management network element. Therefore, resource overheads for policy control can be reduced.

In a possible implementation, before receiving the update request message, the policy control network element may further receive a deletion request message from the second mobility management network element, where the deletion request message is used to request deletion of the policy association. Then, the policy control network element starts a timer. Accordingly, the receiving, by a policy control network element, an update request message from a first mobility management network element is receiving, by the policy control network element, the update request message from the first mobility management network element before the timer expires. Based on this solution, if the policy control network element receives the deletion request message sent by the second mobility management network element for requesting deletion of the policy association, before receiving the update request message, the policy control network element starts the timer. If the policy control network element receives the update request message from the first mobility management network element before the timer expires, the policy control network element updates, according to the update request message, the information about the second mobility management network element in the information of the policy association corresponding to the terminal to the information about the first mobility management network element. Further, if the policy control network element receives the update request message only after the timer expires, the policy control network element deletes the policy association according to the deletion request message when the timer expires. The policy control network element deletes the information of the policy association corresponding to the terminal.

In a possible implementation, after receiving the update request message, the policy control network element may further receive a deletion request message from the second mobility management network element, where the deletion request message is used to request deletion of the policy association, and the policy control network element may ignore the deletion request message. Based on this solution, if, after receiving the update request message, the policy control network element still receives a deletion request message sent by the second mobility management network element for requesting deletion of the policy association, the policy control network element may ignore the deletion request message. This is helpful for the policy control network element to reduce resource overheads.

In a possible implementation, the deletion request message may include a deletion indication, and the deletion indication is used to indicate the policy control network element to delete the policy association when no request message for updating the policy association is received. That the policy control network element starts a timer includes that the policy control network element starts the timer in response to the deletion indication. The deletion indication herein is a conditional deletion indication, used to indicate the policy control unit to delete the policy association if no request message for updating the policy association, for example, the foregoing update request message, is received.

In an embodiment, the deletion indication may be alternatively implemented in any of the following manners.

For example, the deletion indication is used to indicate the policy control network element not to delete the policy association if the policy control network element has received the request message sent by the first mobility management network element for updating the policy association.

For another example, the deletion indication may be alternatively used to indicate the policy control network element not to delete the policy association if the policy control network element has received the request message sent by the first mobility management network element for updating the policy association, and to delete the policy association if the policy control network element has not received the request message for updating the policy association. The deleting the policy association means deleting the information of the policy association corresponding to the terminal.

In a possible implementation, the deletion request message may further include a mobility management network element change indication, and the mobility management network element change indication is used to indicate that the deletion request message is triggered by a mobility management network element change. That the policy control network element starts a timer may include that the policy control network element starts the timer in response to the mobility management network element change indication. Based on this solution, when the policy control network element receives the deletion request message, the policy control network element may determine, based on the mobility management network element change indication in the deletion request message, that there has been a mobility management network element reselection, and therefore starts the timer.

In a possible implementation, the policy control network element may further send a notification message to the second mobility management network element, where the notification message is used to notify that the policy control network element has received the update request message.

In a possible implementation, the update request message may further include a mobility management network element change indication. The mobility management network element change indication in the update request message may be used to trigger the policy control network element to update the information of the policy association.

According to a second aspect, this application provides a policy control method. The method includes receiving, by a first mobility management network element, a context of a terminal from a second mobility management network element, where the context of the terminal includes information of a policy association corresponding to the terminal, and the information of the policy association includes an identifier of a policy control network element, and then, if selecting the policy control network element, sending, by the first mobility management network element, an update request message to the policy control network element, where the update request message includes information about the first mobility management network element, and the update request message is used to request the policy control network element to update information about the second mobility management network element in the information of the policy association to the information about the first mobility management network element. Based on this solution, in a mobility management network element reselection scenario, the first mobility management network element is a reselected mobility management network element, the second mobility management network element is a mobility management network element selected before the reselection, and the policy control network element is a policy control network element that has established a policy association with the second mobility management network element. After obtaining, from the second mobility management network element, the information of the policy association corresponding to the terminal, the first mobility management network element can obtain the identifier of the policy control network element in the information of the policy association. If the first mobility management network element determines to use the policy control network element, the first mobility management network element sends the update request message to the policy control network element, where the update request message includes the information about the first mobility management network element, and the update request message is used to request the policy control network element to update the information about the second mobility management network element in the information of the policy association to the information about the first mobility management network element such that the policy control network element can update, according to the update request message, the information about the second mobility management network element in the information of the policy association corresponding to the terminal that is stored in the policy control network element to the information about the first mobility management network element. The policy control network element does not need to re-establish a policy association with the first mobility management network element after deleting the information about the second mobility management network element in the information of the policy association corresponding to the terminal. Instead, the policy control network element directly updates the information about the second mobility management network element in the information of the policy association corresponding to the terminal to the information about the first mobility management network element. Therefore, resource overheads for policy control can be reduced.

In a possible implementation, the update request message may further include a mobility management network element change indication. The mobility management network element change indication in the update request message may be used to trigger the policy control network element to update the information of the policy association.

In a possible implementation, the information of the policy association included in the context of the terminal that is obtained by the first mobility management network element from the second mobility management network element, may further include an identifier of a resource that is created by the policy control network element and that corresponds to the policy association, the update request message may further include the identifier of the resource, and the update request message may be used to request updating of the information about the second mobility management network element in the resource to the information about the first mobility management network element.

According to a third aspect, this application provides a policy control method. The method includes receiving, by a second mobility management network element, a request message from a first mobility management network element, where the request message is used to request a context of a terminal, and then sending, by the second mobility management network element, the context of the terminal to the first mobility management network element, where the context of the terminal includes information of a policy association corresponding to the terminal, and the information of the policy association includes an identifier of a policy control network element.

In a possible implementation, the second mobility management network element may further starts a timer. If the timer expires, and the second mobility management network element has not received any notification message sent by the policy control network element, where the notification message is used to notify that the policy control network element has received a request message sent by the first mobility management network element for updating the policy association, the second mobility management network element sends a first deletion request message to the policy control network element, where the first deletion request message is used to request the policy control network element to delete the policy association. Based on this solution, after starting the timer, if the second mobility management network element has not received, before the timer expires, any notification message used to notify that the policy control network element has received the request message sent by the first mobility management network element for updating the policy association, the second mobility management network element determines that the policy association needs to be deleted, and sends, to the policy control network element, the first deletion request message used to request the policy control network element to delete the policy association. Thus the policy control network element deletes the information of the policy association of the second mobility management network element that is no longer used after the reselection. This helps avoid errors.

In a possible implementation, the second mobility management network element may alternatively send a second deletion request message to the policy control network element, where the second deletion request message includes a deletion indication, and the deletion indication is used to indicate the policy control network element to delete the policy association when no request message for updating the policy association is received. Based on this solution, the second mobility management network element sends the second deletion request message including the deletion indication to the policy control network element. In this way, after a reselection, if the policy control network element has not received any request message for updating the policy association, it indicates that the first mobility management network element has not selected the policy control network element. Therefore, the policy control network element can delete information of the policy association of the second mobility management network element that is no longer used after the reselection. This helps avoid errors.

In a possible implementation, the second mobility management network element may alternatively send a third deletion request message to the policy control network element, where the third deletion request message includes a mobility management network element change indication, and the mobility management network element change indication is used to indicate that the deletion request message is triggered by a mobility management network element change.

In a possible implementation, the information of the policy association may further include an identifier of a resource that is created by the policy control network element and that corresponds to the policy association.

According to a fourth aspect, this application provides a policy control method. The method includes receiving, by a policy control network element, a deletion request message from a second mobility management network element, where the deletion request message is used to request the policy control network element to delete a policy association corresponding to a terminal, and then starting, by the policy control network element, a timer. If the timer expires and the policy control network element has not received an update request message from a first mobility management network element, the policy control network element deletes the policy association. The update request message includes information about the first mobility management network element, and the update request message is used to request the policy control network element to update information about the second mobility management network element in information of the policy association to the information about the first mobility management network element. Based on this solution, in a mobility management network element reselection scenario, the first mobility management network element is a reselected mobility management network element, the second mobility management network element is a mobility management network element selected before the reselection, and the policy control network element is a policy control network element that has established a policy association with the second mobility management network element. After receiving the deletion request message sent by the second mobility management network element for requesting the policy control network element to delete the policy association corresponding to the terminal, the policy control network element starts the timer. If the policy control network element has not received, before the timer expires, information used to notify that the policy control network element has received the update request message sent by the first mobility management network element, the policy control network element determines that the policy association needs to be deleted, and therefore deletes the information of the policy association. Thus the policy control network element deletes the information of the policy association of the second mobility management network element that is no longer used after the reselection. This helps avoid errors.

In a possible implementation, the deletion request message includes a deletion indication, and the deletion indication is used to indicate the policy control network element to delete the policy association when no request message for updating the policy association is received. The starting, by the policy control network element, a timer may include starting, by the policy control network element, the timer in response to the deletion indication.

The deletion indication herein is a conditional deletion indication, used to indicate the policy control network element to delete the policy association if no request message for updating the policy association, for example, the foregoing update request message, is received.

In an embodiment, the deletion indication may be alternatively implemented in any of the following manners.

For example, the deletion indication is used to indicate the policy control network element not to delete the policy association if the policy control network element has received the request message sent by the first mobility management network element for updating the policy association.

For another example, the deletion indication may be alternatively used to indicate the policy control network element not to delete the policy association if the policy control network element has received the request message sent by the first mobility management network element for updating the policy association, and to delete the policy association if the policy control network element has not received the request message for updating the policy association. The deleting the policy association means deleting the information of the policy association corresponding to the terminal.

In a possible implementation, the deletion request message may further include a mobility management network element change indication, and the mobility management network element change indication is used to indicate that the deletion request message is triggered by a mobility management network element change. The starting, by the policy control network element, a timer may include starting, by the policy control network element, the timer in response to the mobility management network element change indication. Based on this solution, when the policy control network element receives the deletion request message, the policy control network element may determine, based on the mobility management network element change indication in the deletion request message, that there has been a mobility management network element reselection, and therefore starts the timer.

In the embodiments of any one of the foregoing first aspect, the second aspect, the third aspect, or the fourth aspect, the information about the first mobility management network element may include at least one of the following information an identifier of the first mobility management network element, an address of the first mobility management network element for receiving a policy update, a current subscription policy of the terminal, and current access information of the terminal. The information about the first mobility management network element herein is information of a policy association corresponding to the terminal after update by the policy control network element.

In the embodiments of any one of the foregoing first aspect, the second aspect, the third aspect, or the fourth aspect, the policy association may be established for the terminal by the second mobility management network element or a third mobility management network element. The third mobility management network element is a mobility management network element other than the first mobility management network element and the second mobility management network element. The policy association is an association between the second mobility management network element and the policy control network element, where the association is used for conveying, by the second mobility management network element to the policy control network element, a parameter related to current access of the terminal, and for providing, by the policy control network element to the second mobility management network element, a related policy for the terminal. On a side of the second mobility management network element, the policy association includes information of the policy association that is stored in the second mobility management network element, for example, an identifier of the policy control network element, a resource identifier corresponding to the policy association, and a policy for the terminal that is made and provided by the policy control network element. On a side of the policy control network element, the policy association includes information of the policy association that is stored in the policy control network element, for example, an identifier of the second mobility management network element, an address of the second mobility management network element for receiving a policy update, and a policy made for the terminal by the policy control network element.

According to a fifth aspect, this application provides an apparatus. The apparatus may be a mobility management network element, a policy control network element, or a chip. The apparatus has a function of implementing the embodiments of any one of the first aspect, the second aspect, the third aspect, or the fourth aspect. The function may be implemented using hardware, or may be implemented by hardware executing corresponding software. The hardware or software includes one or more modules corresponding to the foregoing function.

According to a sixth aspect, an apparatus is provided, including a processor and a memory. The memory is configured to store a computer-executable instruction, and when the apparatus runs, the processor executes the computer-executable instruction stored in the memory such that the apparatus performs the policy control method according to any one of the first aspect or the possible implementations of the first aspect, or performs the policy control method according to any one of the second aspect or the possible implementations of the second aspect, or performs the policy control method according to any one of the third aspect or the possible implementations of the third aspect, or performs the policy control method according to any one of the fourth aspect or the possible implementations of the fourth aspect.

According to a seventh aspect, this application further provides a computer-readable storage medium. The computer-readable storage medium stores an instruction, and when the instruction runs on a computer, the computer performs the methods described in the foregoing aspects.

According to an eighth aspect, this application further provides a computer program product including an instruction. When the instruction runs on a computer, the computer performs the methods described in the foregoing aspects.

According to a ninth aspect, this application further provides a system. The system includes the first mobility management network element according to any one of the foregoing aspects and the policy control network element according to any one of the foregoing aspects. Further, the system may further include the second mobility management network element according to any one of the foregoing aspects.

These aspects or other aspects of this application are clearer and more comprehensible in the following description of embodiments.

DESCRIPTION OF EMBODIMENTS

To make the objectives, technical solutions, and advantages of this application clearer, the following further describes this application in detail with reference to the accompanying drawings. Specific operation methods in method embodiments may also be applied to apparatus embodiments or system embodiments. In the descriptions of this application, unless otherwise stated, "a plurality of" means at least two.

Network architectures and service scenarios described in the embodiments of this application are used so that the technical solutions in the embodiments of this application are described more clearly, rather than used to limit the technical solutions provided in the embodiments of this application. A person of ordinary skill in the art may know that as the network architecture evolves and new service scenarios emerge, the technical solutions provided in the embodiments of this application are also applicable to similar technical issues.

Figure 1A:
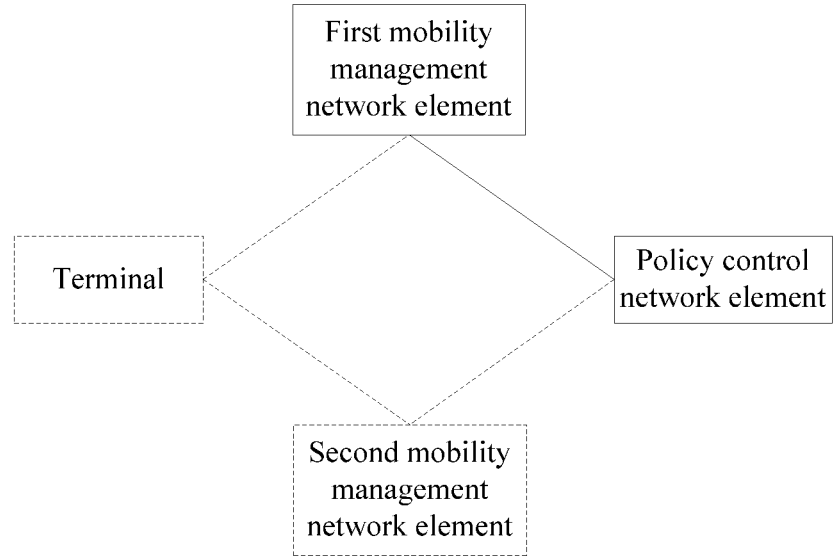
FIG. 1A is a schematic diagram of a possible network architecture according to this application.

FIG. 1A is a schematic diagram of a possible network architecture to which this application is applicable. The network architecture includes a first mobility management network element and a policy control network element, and optionally, may further include a second mobility management network element. This application is mainly applied to scenarios with a reselection of a mobility management network element. A mobility management network element to which a terminal is connected before the reselection is the second mobility management network element. A mobility management network element to which the terminal is connected after the reselection is the first mobility management network element.

In one application scenario, as shown in FIG. 1A, the first mobility management network element and the second mobility management network element may use one policy control network element. In an embodiment, a policy control network element selected by the first mobility management network element is a policy control network element used by the second mobility management network element. In another application scenario, the first mobility management network element and the second mobility management network element may use different policy control network elements. In an embodiment, a policy control network element selected by the first mobility management network element is not a policy control network element used by the second mobility management network element. This application scenario is not shown in FIG. 1A.

A terminal in this application is a device provided with a wireless transmission and reception function. The device may be deployed on land, including indoor or outdoor, handheld, or in-vehicle deployment, or may be deployed on water (for example, on a steamer), or may be deployed in air (for example, on an air plane, a balloon, or a satellite). The terminal device may be a mobile phone, a tablet computer (pad), a computer having a wireless transmission and reception function, a virtual reality (VR) terminal, an augmented reality (AR) terminal, a wireless terminal in industrial control, a wireless terminal in self driving, a wireless terminal in remote medical, a wireless terminal in smart grid, a wireless terminal in transportation safety, a wireless terminal in smart city, a wireless terminal in smart home, or the like.

A mobility management network element, for example, the first mobility management network element or the second mobility management network element in this application, is mainly used for mobility management, such as location update, network registration, and handover of users, in a mobile network. In 5G communications, the mobility management network element may be an AMF network element. In future communications, for example, the 6th generation (6G) communications, the mobility management network element may still be an AMF network element, or have other names. This is not limited in this application.

A policy control network element includes functions such as a user subscription data management function, a policy control function, a charging policy control function, and a quality of service (QoS) control function. In 5G, the policy control network element may be a PCF network element. In future communications, for example, 6G, the policy control network element may still be a PCF network element, or have other names. This is not limited in this application.

Figure 1B:
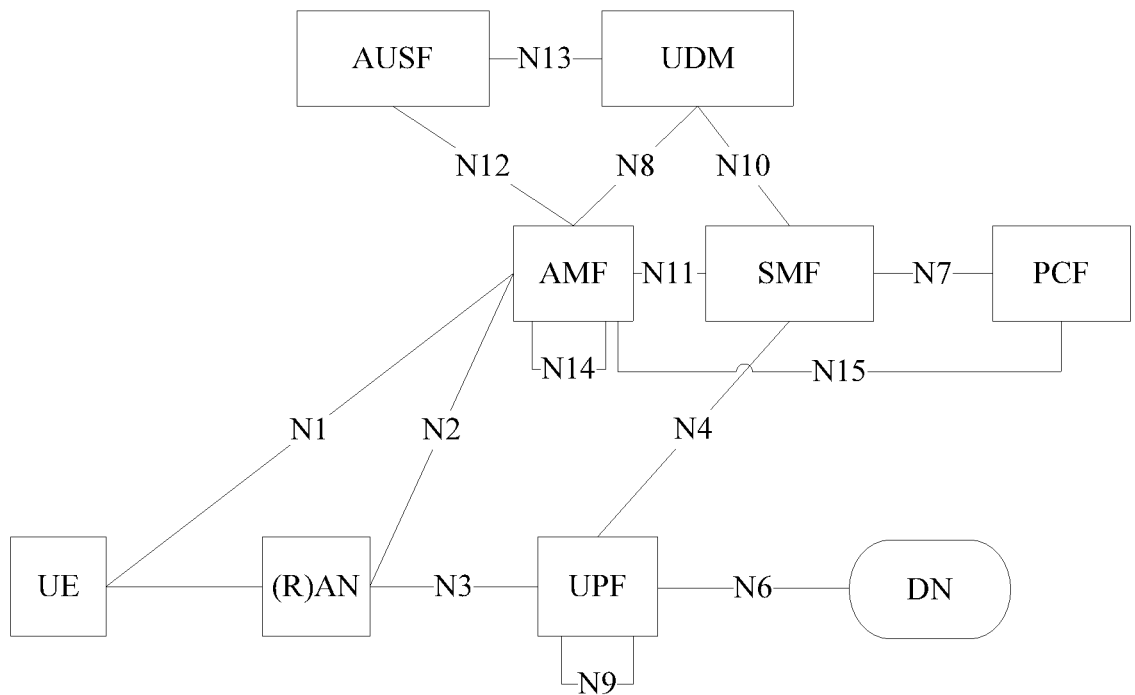
FIG. 1B is a schematic diagram of another possible network architecture according to this application.

FIG. 1B is a schematic diagram of another possible network architecture to which this application is applicable. This network architecture is a 5G network architecture. The network architecture further includes a (radio) access network ((radio) access network, (R)AN), an AMF network element, a session management function (SMF) network element, a user plane function (UPF) network element, a unified data management (UDM) network element, an authentication server function (AUSF) network element, a data network (DN), and the like.

A primary function of the (R)AN is to control radio access of a user to a mobile communications network. The (R)AN is a part of the mobile communications network, and implements a radio access technology. An (R)AN device includes but is not limited to a 5G new radio (NR) base station (gNB) in 5G, an evolved node B (eNB), a radio network controller (RNC), a node B (NB), a base station controller (BSC), a base transceiver station (BTS), a home base station (for example, a home evolved nodeB or a home node B (HNB)), a baseband unit (BBU), a transmitting and receiving point (TRP), a transmitting point (TP), a mobile switching center, and the like. In addition, the (R)AN device may further include a WI-FI access point (AP), and the like.

The SMF network element is responsible for session management, for example, establishment of user sessions.

The UPF network element is a user plane function network element, mainly responsible for connectivity to an external network. The UPF network element includes related functions of a serving gateway (SGW) and a public data network gateway (PDN-GW) in Long Term Evolution (LTE).

The DN is a network responsible for providing services for a terminal. For example, some DNs provide internet connectivity for terminals, and some other DNs provide short messaging functions for terminals.

The AUSF network element has an authentication service function, and is configured to terminate authentication requests from a Security Anchor Function (SEAF).

The UDM network element can store user subscription information and the like.

In the architecture shown in FIG. 1B, main network elements related to this application are the AMF network element, the UDM network element, and the PCF network element.

A terminal (which is user equipment (UE) in the figure) may communicate with the AMF network element through an N1 interface, the (R)AN device communicates with the AMF network element through an N2 interface, the (R)AN device communicates with the UPF network element through an N3 interface, the UPF network element communicates with the SMF network element through an N4 interface, the UPF network element communicates with the DN through an N6 interface, the SMF network element communicates with the PCF network element through an N7 interface, the AMF network element communicates with the UDM network element through an N8 interface, the SMF network element communicates with the UDM network element through an N10 interface, the AMF network element communicates with the SMF network element through an N11 interface, the AMF network element communicates with the AUSF network element through an N12 interface, the AUSF network element communicates with the UDM network element through an N13 interface, different AMF network elements communicate with each other through an N14 interface, and the AMF network element communicates with the PCF network element through an N15 interface. It should be noted that names of interfaces between different network elements in the network architecture shown in FIG. 1B are not limited in this application, and the foregoing interface names are only used as examples for description.

According to the network architecture shown in FIG. 1B, the UE is served by one AMF before an AMF network element reselection, and served by another AMF network element after the AMF network element reselection.

It can be understood that the foregoing functions may be network elements in a hardware device, software functions running on dedicated hardware, or virtualized functions instantiated on a platform (for example, cloud platform).

For ease of description, this application is described below using an example in which the mobility management network element is referred to as an AMF network element and the policy control network element is referred to as a PCF network element. For example, the first mobility management network element may be referred to as a first AMF network element, and the second mobility management network element may be referred to as a second AMF network element. Further, the AMF network element is simply referred to as an AMF, and the PCF network element is simply referred to as a PCF. Therefore, the first AMF network element may be simply referred to as a first AMF, and the second AMF network element may be simply referred to as a second AMF. In other words, all AMFs described in this application below can be replaced with mobility management network elements, and all PCFs can be replaced with policy control network elements.

The following describes in detail, with reference to the accompanying drawings, a policy control method provided in this application. It should be noted that names of messages in the embodiments of this application are merely examples, and do not constitute any limitation on the messages. In 5G networks and other future networks, the messages in the embodiments of this application may have other names. This is not limited in the embodiments of this application.

Figure 2:
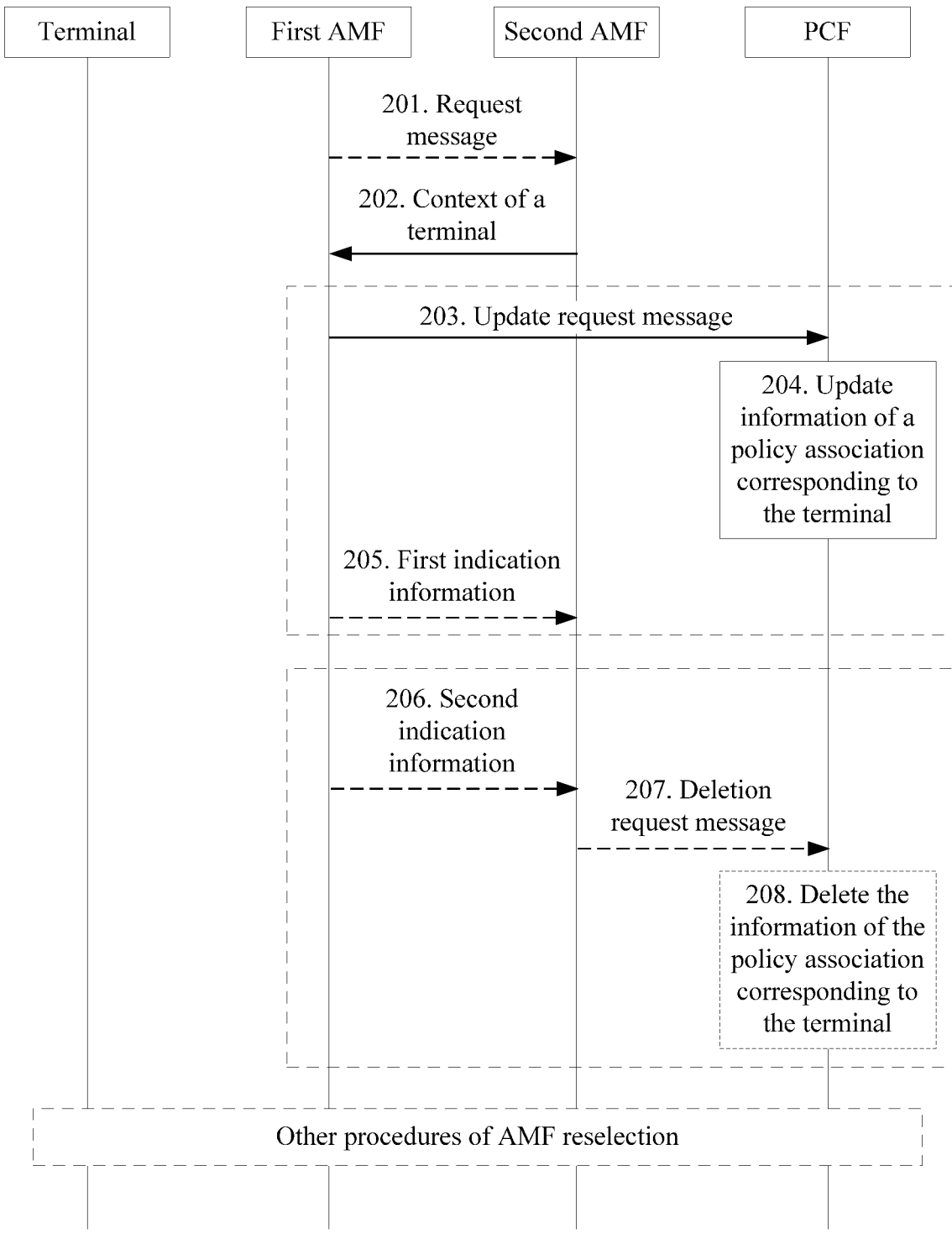
FIG. 2 is a flowchart of a policy control method according to this application.

FIG. 2 shows a policy control method according to this application. This method is applied to scenarios with an AMF reselection, where a first AMF is an AMF to which a terminal is connected after the reselection, and a second AMF is an AMF to which the terminal is connected before the reselection. The method includes the following steps.

Step 201. The first AMF sends a request message to the second AMF. Accordingly, the second AMF may receive the request message. The request message may be used to request a context of the terminal.

It should be noted that step 201 is optional. This step may alternatively not be performed in an embodiment.

Step 202. The second AMF sends the context of the terminal to the first AMF. Accordingly, the first AMF may receive the context of the terminal.

The context of the terminal that is sent by the second AMF to the first AMF includes information of a policy association corresponding to the terminal, where the information of the policy association includes an identifier of a PCF. The PCF is a PCF that has established an association with the second AMF. The PCF is a PCF used by the second AMF for establishment of a policy association for the terminal, or in other words, the PCF is a PCF selected by the second AMF for establishment of a policy association for the terminal. For ease of description, as a general annotation, the PCF is simply referred to below as a PCF used by the second AMF.

It should be noted that the second AMF does not send the identifier of the PCF to the first AMF in the information of the policy association unless the second AMF determines that the first AMF and the second AMF are in one PLMN. When the second AMF determines that the first AMF and the second AMF are not in one PLMN, the second AMF may skip sending the identifier of the PCF to the first AMF, and the first AMF is not allowed to use the PCF.

The second AMF may be alternatively referred to as an old AMF, the PCF may be alternatively referred to as an old PCF, and the first AMF may be alternatively referred to as a new AMF. After an AMF selection, a PCF used by the new AMF is referred to as a new PCF. The new PCF may be the old PCF, or a PCF other than the old PCF.

The policy association herein means an association between the second AMF and the PCF, and the association is used for conveying, by the second AMF to the PCF, a parameter related to current access of the terminal, and for providing, by the AMF to the second AMF, a related policy for the terminal. On a side of the second AMF, the policy association includes information of the policy association that is stored in the second AMF, for example, the identifier of the PCF, a resource identifier corresponding to the policy association, and a policy for the terminal that is made and provided by the PCF. On a side of the PCF, the policy association includes information of the policy association that is stored in the PCF, for example, an identifier of the second AMF, an address of the second AMF for receiving a policy update, and a policy made for the terminal by the PCF. The policy association may be established by the second AMF for the terminal by initiating a request, or may be established by a third AMF for the terminal by initiating a request. The third AMF may be an AMF other than the first AMF and the second AMF. The policy association may be alternatively referred to as a policy control association.

After receiving the context of the terminal that is sent by the second AMF, the first AMF obtains the information of the policy association from the context of the terminal. The information of the policy association includes an identifier of a PCF, and this PCF is the PCF used by the second AMF. Then, the first AMF determines whether to use the PCF.

In one circumstance, the first AMF determines to use the PCF. In this case, the PCF selected by the first AMF is also the PCF used by the second AMF. If the first AMF determines to use the PCF, step 203 to step 205 are performed.

In another circumstance, the first AMF determines not to use the PCF. In this case, the first AMF reselects a PCF other than the PCF used by the second AMF. If the first AMF determines not to use the PCF, step 206 to step 208 are performed.

Step 203. The first AMF sends an update request message to the PCF. Accordingly, the PCF may receive the update request message. The update request message includes information about the first AMF.

It can be understood that the update request message is used to request the PCF to update information about the second AMF in the information of the policy association to the information about the first AMF. The update request message is used to request the PCF to update the information about the second AMF in the information of the policy association that is stored in the PCF to the information about the first AMF.

In an implementation, the information about the first AMF may include some or all of the following information an identifier of the first AMF, an address of the first AMF for receiving a policy update, a current subscription policy of the terminal, or current access information of the terminal. The current subscription policy of the terminal may include a subscription policy such as a service area restriction policy or a radio spectrum selection policy. The current access information of the terminal may include information such as an access type, a time zone of the terminal, or a serving network.

In an implementation, the information about the second AMF may include some or all of the following information an identifier of the second AMF, an address of the second AMF for receiving a policy update, a subscription policy of the terminal, or access information of the terminal.

Step 204. The PCF updates the information of the policy association corresponding to the terminal.

The PCF updates, based on the received update request message, the information about the second AMF in the information of the policy association corresponding to the terminal to the information about the first AMF.

In another implementation, the update request message may further include an AMF change indication. The AMF change indication is used to trigger the PCF to update the information of the policy association corresponding to the terminal. The PCF receives the update request message, and updates, in response to the AMF change indication in the update request message, the information about the second AMF in the information of the policy association corresponding to the terminal to the information about the first AMF.

For example, that the PCF updates the information of the policy association corresponding to the terminal may include at least one of the following operations, that is, may include one, two, three, or four of the following four operations updating the identifier of the second AMF to the identifier of the first AMF, updating the address of the second AMF for receiving a policy update to the address of the first AMF for receiving a policy update, updating the subscription policy of the terminal to the current subscription policy of the terminal, and updating the access information of the terminal to the current access information of the terminal.

In still another implementation, in step 202, the information of the policy association that is obtained by the first AMF may further include an identifier of a resource that is created by the PCF and that corresponds to the policy association, and the update request message in step 203 may further include the identifier of the resource. Then in step 204, a specific method for the PCF to update the information of the policy association corresponding to the terminal is the PCF updates the information about the second AMF in the resource indicated by the identifier of the resource to the information about the first AMF.

In an implementation, after the PCF updates the information of the policy association corresponding to the terminal, the PCF may further update, based on the updated information of the policy association, a policy previously made for the terminal. Further, after updating the policy previously established for the terminal, the PCF may further send the updated policy to the address of the second AMF for receiving a policy update.

In step 201 to step 204, in this AMF reselection scenario, the first AMF is a reselected AMF, the second AMF is an AMF selected before the reselection, and the PCF is a PCF that has established a policy association with the second AMF. After receiving the update request message sent by the first AMF, the PCF may update the information about the second AMF in the information of the policy association corresponding to the terminal that is stored in the PCF to the information about the first AMF, where the information about the first AMF is carried in the update request message. The PCF does not need to re-establish a policy association with the first AMF after deleting the information about the second AMF in the information of the policy association corresponding to the terminal. Instead, the PCF updates the information about the second AMF in the information of the policy association corresponding to the terminal to the information about the first AMF. Therefore, a new resource does not need to be created on the PCF for the first AMF. In addition, the PCF does not need to interact with a unified data repository (UDR) to obtain subscription data of the terminal and the policy previously established for the terminal. Therefore, resource overheads for policy control can be reduced.

After step 204, step 205 may be further included.

Step 205. The first AMF sends first indication information to the second AMF. Accordingly, the second AMF receives the first indication information.

The first indication information is used to notify the second AMF that the first AMF has selected the PCF used by the second AMF. Then, the second AMF can determine that the first AMF is using the PCF used by the second AMF. Therefore, the second AMF does not send any deletion request message to the PCF to request the PCF to delete the policy association.

It should be noted that if step 205 is performed, execution of step 204 and step 205 is not limited to any particular order. For example, step 204 may be performed before step 205. Alternatively, step 205 may be performed before step 204.

The procedure ends.

If the first AMF determines not to use the PCF, the first AMF sends a request message to another PCF, referred to as, for example, a new PCF. The request message may include an identifier of the terminal and the identifier of the first AMF, and the request message is used to request to create information about a policy association between the first AMF and the new PCF. In an embodiment, the new PCF may store the information carried in the request message of the first AMF. The new PCF interacts with the UDR to obtain the subscription data of the terminal and the policy established by the PCF for the terminal, establishes a corresponding policy, and provides the corresponding policy to the first AMF. The first AMF executes the corresponding policy. Further, the AMF may further provide the policy to the terminal for execution.

Further, after the first AMF sends the request message to the new PCF, step 206 to step 208 may be further performed.

Step 206. The first AMF sends second indication information to the second AMF.

Accordingly, the second AMF receives the second indication information.

The second indication information is used to notify the second AMF that the first AMF has not selected the PCF used by the second AMF. Then, the second AMF can determine that the first AMF is using a PCF other than the one used by the second AMF. Therefore, the second AMF may send a deletion request message to the PCF to request the PCF to delete the policy association.

Step 207. The second AMF sends a deletion request message to the PCF. Accordingly, the PCF receives the deletion request message. The deletion request message is used to request the PCF to delete the policy association corresponding to the terminal.

Because the second AMF determines that the first AMF is not using the PCF, the second AMF sends the deletion request message to the PCF, to request the PCF to delete the policy association corresponding to the terminal. The second AMF requests the PCF to delete the information of the policy association corresponding to the terminal, including the information about the second AMF in the information of the policy association.

Step 208. The PCF deletes the information of the policy association corresponding to the terminal.

The PCF may delete the information about the second AMF in the information of the policy association.

In step 201 to step 202, and step 206 to step 208, when the first AMF determines to use a PCF other than the one used by the second AMF, the first AMF may notify the second AMF that the first AMF is not using the PCF such that the second AMF can request the PCF to delete the information of the policy association. Therefore, the information of the policy association that is no longer used by the PCF is deleted, helping prevent the PCF from making any wrong policy decision.

It should be noted that the embodiment shown in FIG. 2 only shows some steps in an AMF reselection procedure. For other steps of an AMF reselection, refer to related descriptions in other approaches. For example, reference may be made to 3rd Generation Partnership Project (3GPP) technical specification (TS) 23.502. No further details are described herein.

Figure 3:
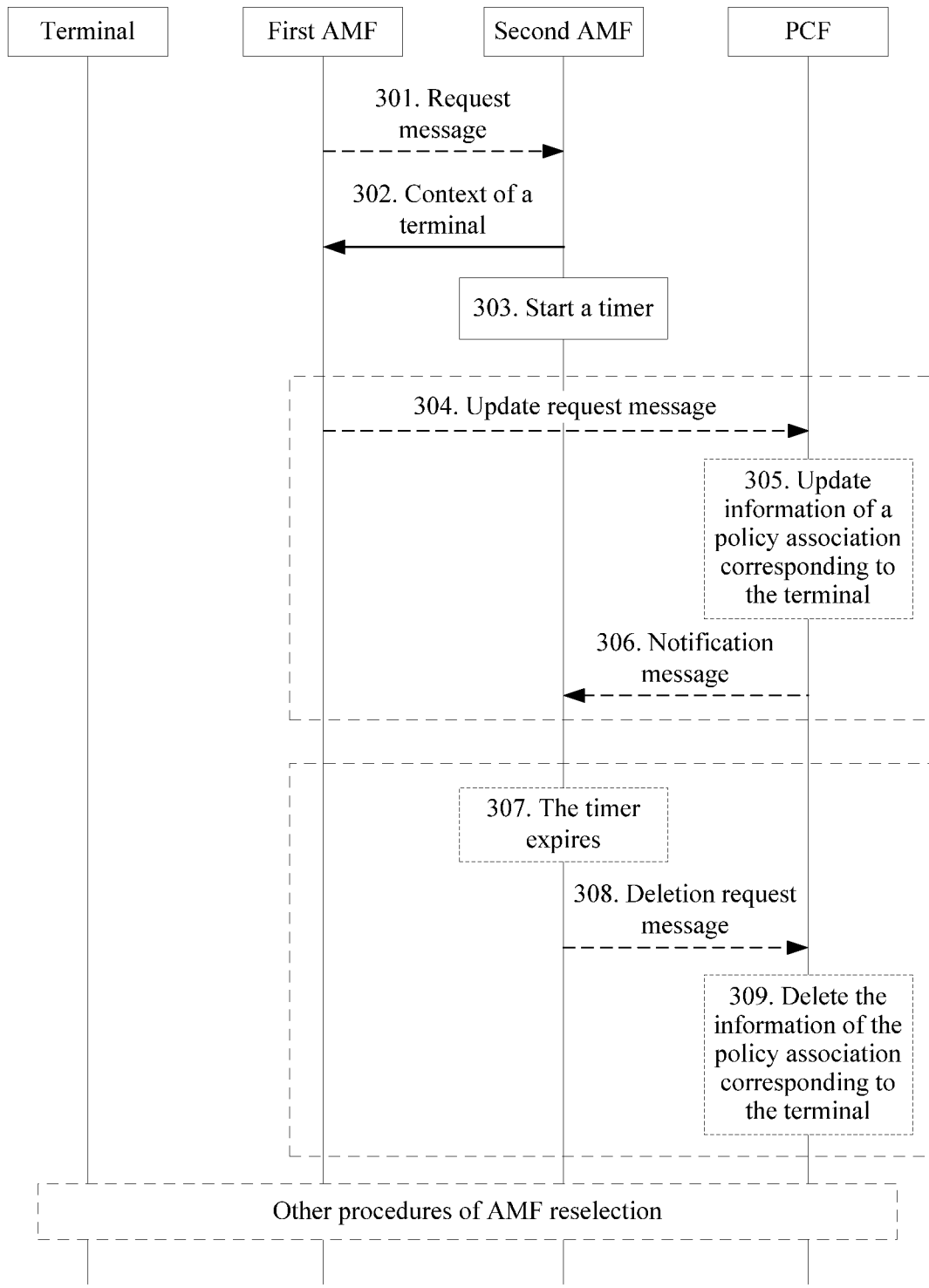
FIG. 3 is a flowchart of another policy control method according to this application.

FIG. 3 shows another policy control method according to this application. This method is applied to scenarios with an AMF reselection, where a first AMF is an AMF to which a terminal is connected after the reselection, and a second AMF is an AMF to which the terminal is connected before the reselection. The method includes the following steps.

Step 301 and step 302 are the same as step 201 and step 202 in the embodiment shown in FIG. 2. Refer to the foregoing descriptions.

Step 303. The second AMF starts a timer.

The timer corresponds to a set duration, and a specific value of the duration may be set as actually required or obtained from another network element, such as a UDM. Generally, the duration can ensure that, in normal circumstances, the second AMF can receive a notification message from the PCF before the timer expires.

If, before the timer expires, the second AMF has received a notification message sent by the PCF, the timer stops countdown. The notification message is used to notify that the PCF has received a request message sent by the first AMF for updating the policy association. The request message may be an update request message sent by the first AMF.

If, before the timer expires, the second AMF has not received any notification message sent by the PCF, the timer is to expire. Therefore, the second AMF can determine that no notification message is received.

In step 302, after receiving the context of the terminal that is sent by the second AMF, the first AMF obtains the information of the policy association from the context of the terminal. The information of the policy association includes an identifier of a PCF, and the PCF is the PCF used by the second AMF. Then, the first AMF determines whether to use the PCF.

In one circumstance, the first AMF determines to use the PCF. In this case, the PCF selected by the first AMF is also the PCF used by the second AMF. If the first AMF determines to use the PCF, step 304 to step 306 are performed.

In another circumstance, the first AMF determines not to use the PCF. In this case, the first AMF reselects a PCF other than the PCF used by the second AMF. If the first AMF determines not to use the PCF, step 307 to step 309 are performed.

Step 304 and step 305 are the same as step 203 and step 204 in the embodiment shown in FIG. 2. Refer to the foregoing descriptions, and details are not described herein again.

Step 306. The PCF sends a notification message to the second AMF. Accordingly, the second AMF may receive the notification message.

The notification message is used to notify that the PCF has received a request message sent by the first AMF for updating the policy association. The PCF has received an update request message sent by the first AMF.

After receiving the notification message, the second AMF can determine that the PCF the first AMF selects to use is the PCF used by the second AMF, or it is understood that the first AMF and the second AMF use one PCF. Therefore, the second AMF does not send a deletion request message to the PCF to request the PCF to delete the policy association.

It should be noted that a condition for the second AMF not to send the deletion request message to the PCF to request the PCF to delete the policy association is that the second AMF receives the notification message before the timer expires. In a circumstance, if step 304 to step 306 are performed, but the second AMF receives the notification message only after the timer expires, the second AMF still sends the deletion request message to the PCF to request the PCF to delete the policy association. That is, step 308 is performed. In addition, because the PCF has already received the update request message before receiving the deletion request message, the PCF may ignore the deletion request message after receiving the deletion request message. In this embodiment of this application, the deletion request message may be alternatively referred to a first deletion request message.

In step 301 to step 306, in this AMF reselection scenario, the first AMF is a reselected AMF, the second AMF is an AMF selected before the reselection, and the PCF is a PCF that has established a policy association with the second AMF. After receiving the update request message sent by the first AMF, the PCF may update the information about the second AMF in the information of the policy association corresponding to the terminal that is stored in the PCF to the information about the first AMF, where the information about the first AMF is carried in the update request message. The PCF does not need to re-establish a policy association with the first AMF after deleting the information about the second AMF in the information of the policy association corresponding to the terminal. Instead, the PCF directly updates the information about the second AMF in the information of the policy association corresponding to the terminal to the information about the first AMF. Therefore, a new resource does not need to be created on the PCF for the first AMF. In addition, the PCF does not need to interact with a UDR to obtain subscription data of the terminal and the policy previously established for the terminal. Therefore, resource overheads for policy control can be reduced.

The procedure ends.

If the first AMF determines not to use the PCF, the first AMF sends a request message to another PCF, referred to as, for example, a new PCF. The request message may include an identifier of the terminal and the identifier of the first AMF, and the request message is used to request information for creating a policy association between the first AMF and the new PCF. In an embodiment, the new PCF may store the information carried in the request message of the first AMF. The new PCF interacts with the UDR to obtain the subscription data of the terminal and the policy made by the PCF for the terminal, makes a corresponding policy, and provides the corresponding policy to the first AMF. The first AMF executes the corresponding policy. Further, the AMF may further provide the policy to the terminal for execution.

Further, after the first AMF sends the request message to the new PCF, step 307 to step 309 may be further performed.

Step 307. The second AMF determines that the timer has expired.

Because the first AMF determines not to use the PCF, step 304 to step 306 are not performed. Therefore, before the timer expires, the second AMF is not to receive the notification message in step 306, and the timer is to expire.

In another circumstance, it is possible that the first AMF determines to use the PCF, and step 304 to step 306 are performed but, before the second AMF receives the notification message in step 306, the timer has already expired. In this case, the second AMF also determines that the timer has expired.

Step 308 and step 309 are the same as step 207 and step 208 in the embodiment shown in FIG. 2. Refer to the foregoing descriptions.

It should be noted that the deletion request message in step 308 may be alternatively referred to as a first deletion request message in this embodiment of this application.

In step 301 to step 303, and step 307 to step 309, when the first AMF determines to use a PCF other than the one used by the second AMF, the first AMF may notify the second AMF that the first AMF is not using the PCF such that the second AMF can request the PCF to delete the information of the policy association. Therefore, the information of the policy association that is no longer used by the PCF is deleted, helping prevent the PCF from making any wrong policy decision.

It should be noted that the embodiment shown in FIG. 3 only shows some steps in an AMF reselection procedure. For other steps of an AMF reselection, refer to related descriptions in other approaches. For example, reference may be made to 3GPP TS 23.502. No further details are described herein.

Figure 4:
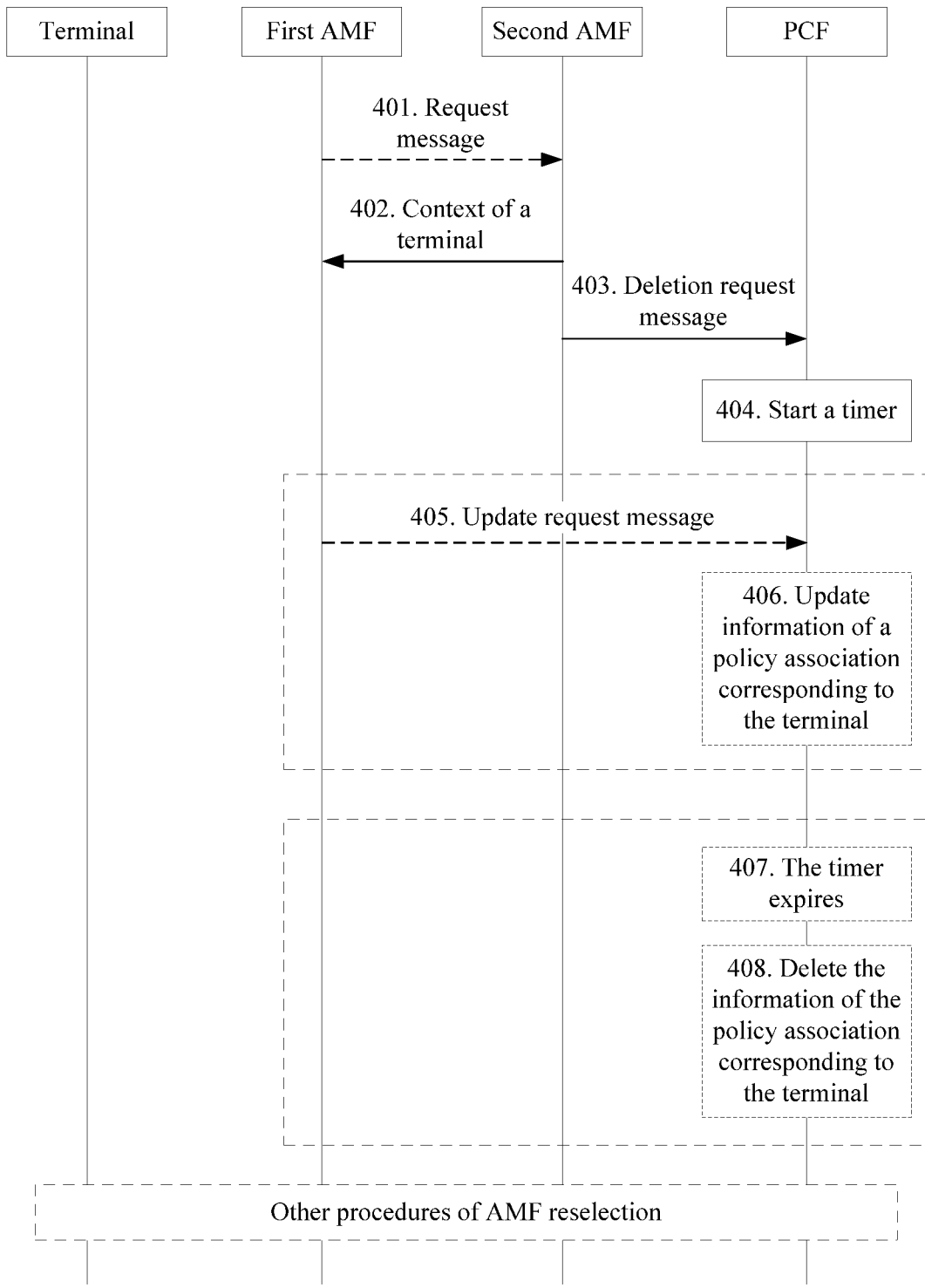
FIG. 4 is a flowchart of another policy control method according to this application.

FIG. 4 shows another policy control method according to this application. This method is applied to scenarios with an AMF reselection, where a first AMF is an AMF to which a terminal is connected after the reselection, and a second AMF is an AMF to which the terminal is connected before the reselection. The method includes the following steps.

Step 401 and step 402 are the same as step 201 and step 202 in the embodiment shown in FIG. 2. Refer to the foregoing descriptions.

Step 403. The second AMF sends a deletion request message to the PCF. Accordingly, the PCF may receive the deletion request message.

The deletion request message is used to request deletion of the policy association. The deletion request message is used to request the PCF to delete the policy association corresponding to the terminal, including the information about the second AMF in the information of the policy association.

Step 404. The PCF starts a timer.

In step 403, after receiving the deletion request message, the PCF can skip immediate deletion of the policy association corresponding to the terminal. Instead, the PCF starts the timer.

In one implementation, after receiving the deletion request message, the PCF starts the timer in response to the deletion request message.

In another implementation, the deletion request message in step 403 may further include a deletion indication, and the deletion indication is used to indicate the PCF to delete the policy association when no request message for updating the policy association is received. That is, the PCF is indicated to delete the policy association when no update request message is received. When the deletion request message includes a deletion indication, the deletion request message may be alternatively referred to as a second deletion request message. After receiving the deletion request message, the PCF can start the timer in response to the deletion indication in the deletion request message.

The deletion indication herein is a conditional deletion indication, used to indicate the PCF to delete the policy association if no request message for updating the policy association, for example, the foregoing update request message, is received. In an embodiment, the deletion indication may be alternatively implemented in any one of the following manners. For example, the deletion indication may be used to indicate the PCF not to delete the policy association if a request message sent by the first AMF for updating the policy association is received. For another example, the deletion indication may be alternatively used to indicate the PCF not to delete the policy association if a request message sent by the first AMF for updating the policy association is received, and to delete the policy association when no request message for updating the policy association is received. The deleting the policy association means deleting information of the policy association corresponding to the terminal.

In still another implementation, the deletion request message in step 403 may further include an AMF change indication, and the AMF change indication is used to notify the PCF of an AMF change, or it is understood that the AMF change indication is used to indicate that the deletion request message is triggered by an AMF change. When the deletion request message includes an AMF change indication, the deletion request message may be alternatively referred to as a third deletion request message. After receiving the deletion request message, the PCF may start the timer in response to the AMF change indication in the deletion request message.

If, before the timer expires, the PCF receives the update request message sent by the first AMF for updating the policy association, the PCF updates the information of the policy association corresponding to the terminal. If the timer expires and the PCF has not received the update request message, or the PCF receives the update request message only after the timer expires, the PCF deletes the information corresponding to the terminal. Details are described below.

In step 402, after receiving the context of the terminal that is sent by the second AMF, the first AMF obtains the information of the policy association from the context of the terminal. The information of the policy association includes an identifier of a PCF, and the PCF is the PCF used by the second AMF. Then, the first AMF determines whether to use the PCF.

In one circumstance, the first AMF determines to use the PCF. In this case, the PCF selected by the first AMF is also the PCF used by the second AMF. If the first AMF determines to use the PCF, step 405 to step 406 are performed.

In another circumstance, the first AMF determines not to use the PCF. In this case, the first AMF reselects a PCF other than the one used by the second AMF. If the first AMF determines not to use the PCF, step 407 and step 408 are performed.

Step 405 and step 406 are the same as step 203 and step 204 in the embodiment shown in FIG. 2. Refer to the foregoing descriptions, and details are not described herein again.

It should be noted that if the timer has not expired when the PCF receives the update request message in step 405, the PCF performs step 406. If the timer has already expired when the PCF receives the update request message in step 405, the PCF skips step 406, and performs step 408 instead.

In step 401 to step 406, in this AMF reselection scenario, the first AMF is a reselected AMF, the second AMF is an AMF selected before the reselection, and the PCF is a PCF that has established a policy association with the second AMF. After receiving the update request message sent by the first AMF, the PCF may update the information about the second AMF in the information of the policy association corresponding to the terminal that is stored in the PCF to the information about the first AMF, where the information about the first AMF is carried in the update request message. The PCF does not need to re-establish a policy association with the first AMF after deleting the information about the second AMF in the information of the policy association corresponding to the terminal. Instead, the PCF directly updates the information about the second AMF in the information of the policy association corresponding to the terminal to the information about the first AMF. Therefore, a new resource does not need to be created on the PCF for the first AMF. In addition, the PCF does not need to interact with a UDR to obtain subscription data of the terminal and the policy previously made for the terminal. Therefore, resource overheads for policy control can be reduced.

The procedure ends.

If the first AMF determines not to use the PCF, the first AMF sends a request message to another PCF, referred to as, for example, a new PCF. The request message may include an identifier of the terminal and the identifier of the first AMF, and the request message is used to request information for creating a policy association between the first AMF and the new PCF. In an embodiment, the new PCF may store the information carried in the request message of the first AMF. The new PCF interacts with the UDR to obtain the subscription data of the terminal and the policy made by the PCF for the terminal, makes a corresponding policy, and provides the corresponding policy to the first AMF. The first AMF executes the corresponding policy. Further, the AMF may further provide the policy to the terminal for execution.

Further, after the first AMF sending the request message to the new PCF, step 407 to step 408 may be further performed.

Step 407. The PCF determines that the timer has expired.

Because the first AMF determines not to use the PCF, step 405 and step 406 are not performed. Therefore, before the timer expires, the PCF is not to receive the update request message in step 405, and the timer is to expire.

In another circumstance, it is possible that the first AMF determines to use the PCF, and step 405 is performed, but before the PCF receives the update request message in step 405, the timer has already expired. In this case, the PCF also determines that the timer has expired.

Step 408 is the same as step 208 in the embodiment shown in FIG. 2. Refer to the foregoing descriptions.

In step 401 to step 404, and step 407 to step 408, when the first AMF determines to use a PCF other than the one used by the second AMF, the first AMF does not send any update request message to the PCF. Therefore, the timer of the PCF is to expire, and the PCF deletes the information of the policy association. Therefore, the information of the policy association that is no longer used by the PCF is deleted, helping prevent the PCF from making any wrong policy decision.

It should be noted that the embodiment shown in FIG. 4 only shows some steps in an AMF reselection procedure. For other steps of an AMF reselection, refer to related descriptions in other approaches. For example, reference may be made to 3GPP TS 23.502. No further details are described herein.

The following describes in detail, with reference to a specific embodiment, the policy control method shown in FIG. 2 to FIG. 4.

Figure 5:
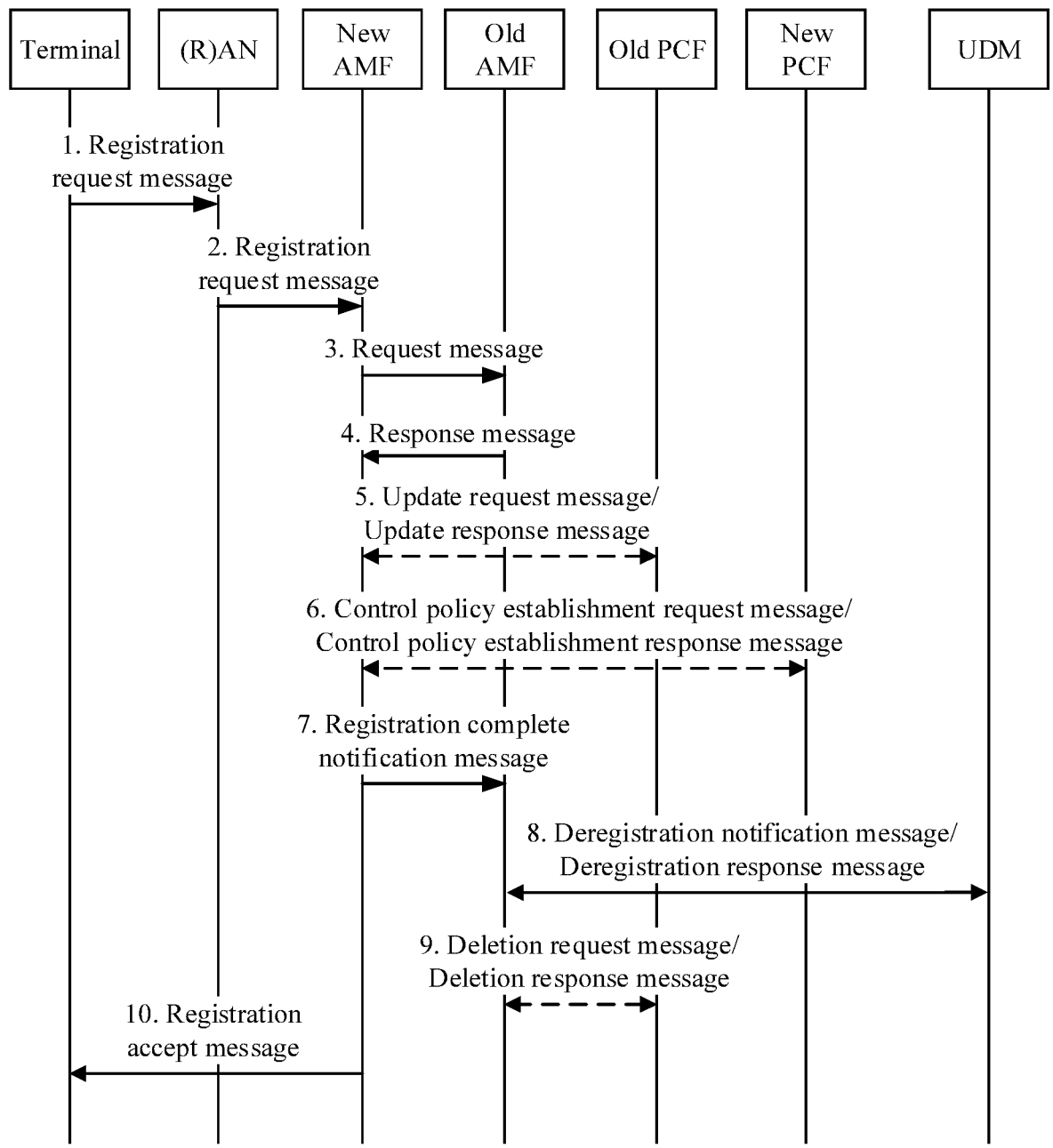
FIG. 5 is a flowchart of another policy control method according to this application.

FIG. 5 shows another policy control method according to this application. The method is a specific implementation of the embodiment shown in FIG. 2. The embodiment shown in FIG. 5 combines the policy control method shown in FIG. 2 and other steps of AMF reselection. The embodiment shown in FIG. 5 is an interaction procedure between AMFs and a PCF in an AMF reselection scenario, where a new AMF is a reselected AMF, an old AMF is an AMF selected before the reselection, and an old PCF is a PCF used by the old AMF. The procedure may be performed when a terminal is in an idle state or a connected state. Before the AMF reselection, a policy association is established between the old AMF and the old PCF. A corresponding resource is created on the old PCF, and a first uniform resource identifier (URI1) of the resource may be, for example, {apiRoot1}/npcf-am-policy-control/v1/policies/policyId1. The resource may include, for example, a policy provided by the old PCF for the terminal, and location information of the terminal that is provided by the old AMF to the PCF.

The following describes the policy control method of this application using an AMF reselection procedure in a registration procedure as an example. For other procedures, for example, an AMF reselection procedure in a handover procedure, refer to the policy control method in the AMF reselection procedure in a registration procedure. No further details are described herein.

The method may include the following steps.

Step 1. A terminal sends a registration request message to a RAN, where the registration request message carries a temporary identifier (for example, a 5G Globally Unique Temporary Identifier (5G-GUTI)) of the terminal. Accordingly, the RAN may receive the registration request message.

Step 2. The (R)AN sends the registration request message to the new AMF, where the registration request message carries the temporary identifier of the terminal. Accordingly, the new AMF may receive the registration request message.

Step 3. The new AMF sends a request message (for example, the request message may be a Namf_Communication_UEContextTransfer Request) to the old AMF based on the temporary identifier of the terminal. The request message is used to request a context of the terminal. For example, the context of the terminal includes a user identifier (for example, a subscription permanent identifier (SUPI)) and a mobility management (MM) context.

Step 4. The old AMF sends a response message to the new AMF, where the response message includes the context of the terminal. Accordingly, the new AMF may receive the response message.

In an implementation, the response message may be a Namf_Communication_UEContextTransfer Response message. The context of the terminal that is carried in the response message includes the user identifier and the MM context.

If the old AMF determines that the old AMF and the new AMF are in one PLMN, the MM context may further include an identifier of the old PCF. Further, the MM context may further include a resource identifier created on the old PCF, that is, URI1: {apiRoot1}/npcf-am-policy-control/v1/policies/policyId1.

Step 5. If the new AMF receives the identifier of the old PCF in step 4, and determines to use the old PCF, the AMF sends an update request message to the old PCF based on the identifier of the old PCF. For example, the update request message may be an Npcf_AMPolicyControl_Update Request message, and the update request message may include information about the new AMF. Accordingly, the old PCF may receive the update request message.

Optionally, the update request message may further carry an AMF change indication. The update request message is used to request updating of the previous policy association between the old AMF and the old PCF. The update request message is used to request the PCF to update information about the old AMF in information of the policy association to the information about the new AMF. The old PCF returns an update response message to the new AMF. For example, the update response message may be an Npcf_AMPolicyControl_Update Response message. Accordingly, the new AMF may receive the update response message.

For example, a specific implementation may be the new AMF sends a Hypertext Transfer Protocol (HTTP) POST to the old PCF, where a requested Uniform Resource Locator (URL) is (URL1) is {apiRoot1}/npcf-am-policy-control/v1/policies/policyId1, and the information about the new AMF is carried in the message body. Optionally, the message body may further carry an AMF change indication. The old PCF updates a resource corresponding to the URI1, including the information about the new AMF. The old PCF returns an HTTP Response message to the new AMF. The AMF change indication may be, for example, a policy control request trigger AMF_CHANG.

Step 6. If the new AMF does not receive the identifier of the old PCF in step 4, or the new AMF receives the identifier of the old PCF but determines not to use the old PCF, the new AMF selects a new PCF, and sends a control policy establishment request message to the new PCF. For example, the control policy establishment request message may be an Npcf_AMPolicyControl_Create Request message. The control policy establishment request message is used to request creation of a policy association between the new AMF and the new PCF, and the control policy establishment request message may carry the user identifier, the information about the new AMF, and the like. Accordingly, the new PCF may receive the control policy establishment request message.

After the new PCF creates the policy association between the new AMF and the new PCF, the new PCF may send a control policy establishment response message to the new AMF. Accordingly, the new AMF may receive the control policy establishment response message.

For example, a specific implementation may be the new AMF sends an HTTP POST to the new PCF, where a requested URL2 may be {apiRoot2}/npcf-am-policy-control/v1/policies/, and the user identifier, the information about the new AMF, and the like are carried in the message body. The new PCF creates a new resource, generates a child resource identifier policyId1, and constructs a third URI (URI3) for the created resource. The URI3 is generated by appending the child resource identifier to the requested URL2 which is used as a parent resource. Therefore, the URI3 is {apiRoot2}/npcf-am-policy-control/v1/policies/policyId1. The new PCF returns an HTTP Response message to the new AMF, where the URI3 is carried in a location head of the message.

It should be noted that only one of step 5 and step 6 is performed. In other words, when step 5 is performed, step 6 is not performed. On the contrary, when step 6 is performed, step 5 is not performed.

Step 7. The new AMF sends a registration complete notification message to the old AMF. For example, the registration complete notification message may be a Namf_Communication_RegistrationCompleteNotify message. The registration complete notification message is used to notify the old AMF that the terminal has completed registration with the new AMF. Accordingly, the old AMF may receive the registration complete notification message.

Further, the registration complete notification message may further carry indication information. For example, the indication information may be a PCF selection indication. The indication information is used to indicate whether the new AMF selects the old PCF or the new PCF.

Step 8. A UDM network element sends a deregistration notification message to the old AMF. For example, the deregistration notification message may be a Nudm_UECM_DeregistrationNotification Request message. Accordingly, the old AMF may receive the deregistration notification message.

The old AMF deletes the MM context of the terminal. Then the old AMF returns a deregistration response message to the UDM network element. For example, the deregistration response message may be a Nudm_UECM_DeregistrationNotification Response message. Accordingly, the UDM network element may receive the deregistration response message.

Step 9. When the old AMF determines, based on the registration complete notification message in step 7, that the new AMF has selected the new PCF, the old AMF sends a deletion request message to the old PCF. For example, the deletion request message may be an Npcf_AMPolicyControl_Delete Request message. The deletion request message is used to request deletion of the information of the policy association previously created between the old AMF and the old PCF. Accordingly, the old PCF may receive the deletion request message.

After the old PCF deletes the information of the policy association, the old PCF sends a deletion response message to the old AMF. Accordingly, the old AMF may receive the deletion response message.

For example, a specific implementation may be the old AMF sends an HTTP Delete message to the old PCF, where a requested URL4 is {apiRoot1}/npcf-am-policy-control/v1/policies/policyId1. After the old PCF deletes a resource corresponding to the URL4, the old PCF returns an HTTP Response message to the old AMF.

Step 10. The new AMF sends a registration accept message to the terminal. Accordingly, the terminal may receive the registration accept message.

Figure 6:
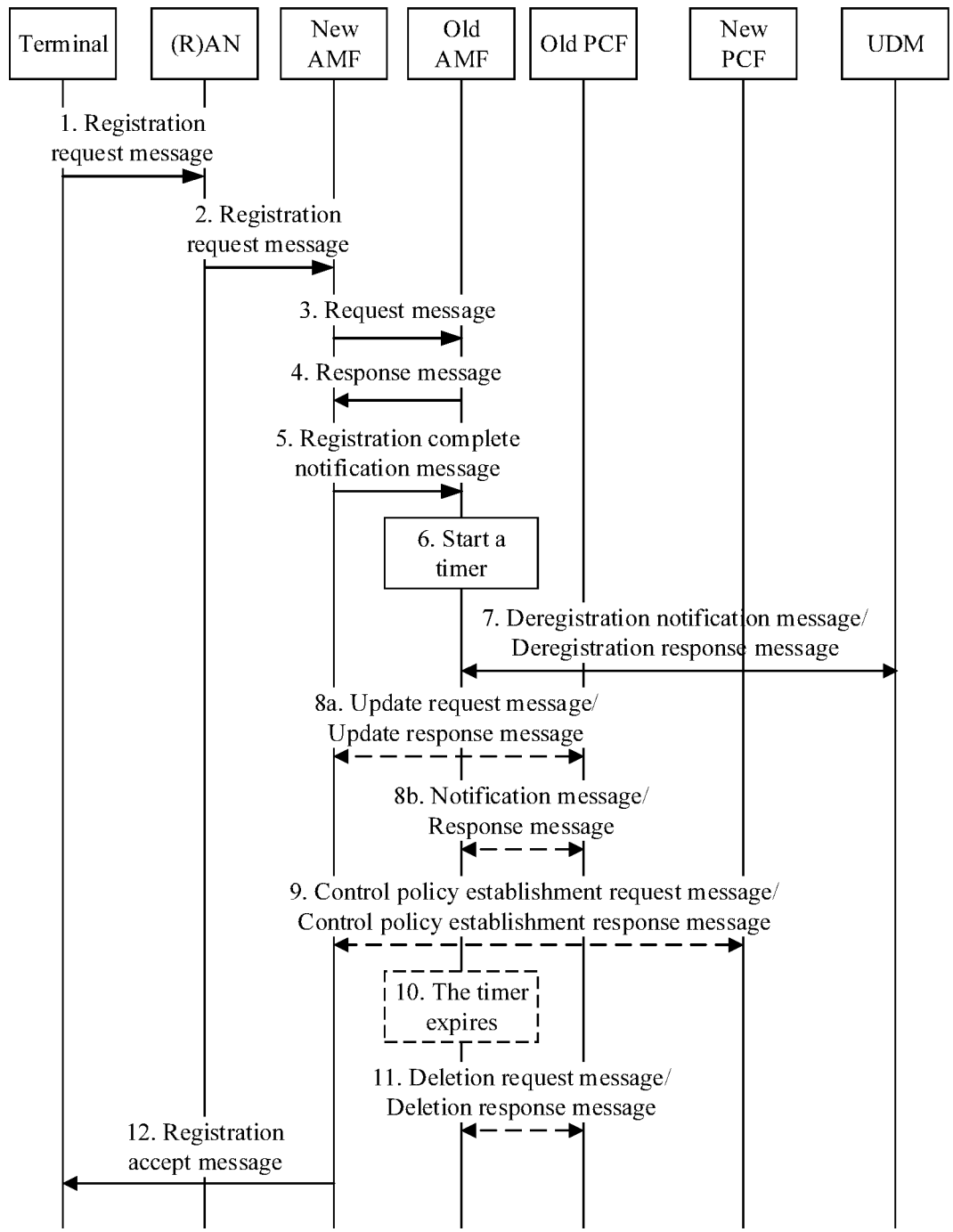
FIG. 6 is a flowchart of another policy control method according to this application.

FIG. 6 shows another policy control method according to this application. The method is a specific implementation of the embodiment shown in FIG. 3. The embodiment shown in FIG. 6 combines the policy control method shown in FIG. 3 and other steps of AMF reselection. The embodiment shown in FIG. 6 is an interaction procedure between AMFs and a PCF in an AMF reselection scenario, where a new AMF is a reselected AMF, an old AMF is an AMF selected before the reselection, and an old PCF is a PCF used by the old AMF. The procedure may be performed when a terminal is in an idle state or a connected state. Before the AMF reselection, a policy association is established between the old AMF and the old PCF. A corresponding resource is created on the old PCF, and a URI1 of the resource may be, for example, {apiRoot1}/npcf-am-policy-control/v1/policies/policyId1. The resource may include, for example, a policy provided by the old PCF for the terminal, and location information of the terminal that is provided by the old AMF to the PCF.

The following describes the policy control method of this application using an AMF reselection procedure in a registration procedure as an example. For other procedures, for example, an AMF reselection procedure in a handover procedure, refer to the policy control method in the AMF reselection procedure in a registration procedure. No further details are described herein.

The method may include the following steps.

Step 1 to step 4 are the same as step 1 to step 4 in the embodiment shown in FIG. 5. Refer to the foregoing descriptions, and details are not described herein again.

Step 5. The new AMF sends a registration complete notification message to the old AMF. For example, the registration complete notification message may be a Namf_Communication_RegistrationCompleteNotify message. The registration complete notification message is used to notify the old AMF that the terminal has completed registration with the new AMF. Accordingly, the old AMF may receive the registration complete notification message.

Step 6. The old AMF starts a timer.

Step 7 is the same as step 8 in the embodiment shown in FIG. 5. Refer to the foregoing descriptions, and details are not described herein again.

It should be noted that step 6 may be performed after step 5 and before step 7, or may be performed after the UDM sends the deregistration notification to the old AMF in step 7. This is not limited in this application.

Then, in one circumstance, if the new AMF selects to use the old PCF, step 8a, step 8b, and step 12 are performed. If the new AMF selects not to use the old PCF, and selects to use a new PCF instead, step 9 to step 12 are performed.

Step 8a is the same as step 5 in the embodiment shown in FIG. 5. Refer to the foregoing descriptions, and details are not described herein again.

Step 8b. The old PCF sends a notification message to the old AMF. For example, the notification message may be an Npcf_AMPolicyControl_Notify Request message. The notification message is used to notify the old AMF that the new AMF uses the old PCF. Accordingly, the old AMF may receive the notification message.

Then, the old AMF may further send a response message to the old PCF, to acknowledge that the old AMF has received the notification message. Accordingly, the old PCF may receive the response message.

For example, a specific implementation may be the old PCF sends an HTTP POST to the old AMF, where a requested URL is {NotifyURL}, and an AMF change indication is carried in the message body. Then the old AMF stops the timer started in step 6. The old AMF returns a response message to the new PCF.

Step 9 is the same as step 6 in the embodiment shown in FIG. 5. Refer to the foregoing descriptions, and details are not described herein again.

Step 10. If the new AMF selects a new PCF, the old AMF is not to receive the notification message in step 8b, and the timer started in step 6 is to expire.

Step 11. After the timer expires, the old AMF sends a deletion request message to the old PCF. For example, the deletion request message may be an Npcf_AMPolicyControl_Delete Request message. The deletion request message is used to request deletion of the information of the policy association previously established between the old AMF and the old PCF. Accordingly, the old PCF may receive the deletion request message.

After the old PCF deletes the information of the policy association, the old PCF sends a deletion response message to the old AMF. Accordingly, the old AMF may receive the deletion response message.

For example, a specific implementation may be the old AMF sends an HTTP Delete message to the old PCF, where a requested URL4 is {apiRoot1}/npcf-am-policy-control/v1/policies/policyId1. After the old PCF deletes a resource corresponding to the URL4, the old PCF returns an HTTP Response message to the old AMF.

Step 12. The new AMF sends a registration accept message to the terminal. Accordingly, the terminal may receive the registration accept message.

Figure 7:
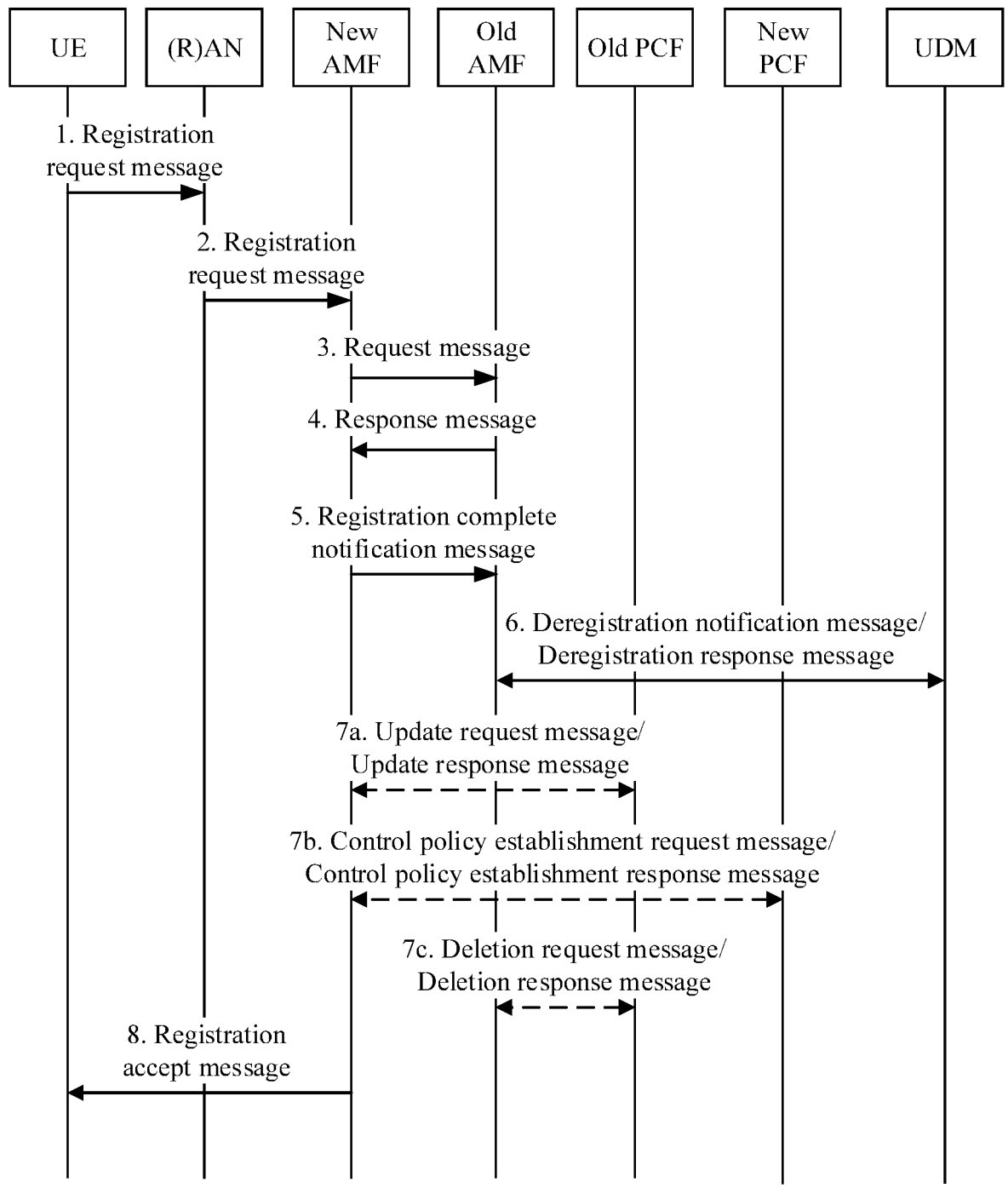
FIG. 7 is a flowchart of another policy control method according to this application.

FIG. 7 shows another policy control method according to this application. The method is a specific implementation of the embodiment shown in FIG. 4. The embodiment shown in FIG. 7 combines the policy control method shown in FIG. 4 and other steps of AMF reselection. The embodiment shown in FIG. 7 is an interaction procedure between AMFs and a PCF in an AMF reselection scenario, where a new AMF is a reselected AMF, an old AMF is an AMF selected before the reselection, and an old PCF is a PCF used by the old AMF. The procedure may be performed when a terminal is in an idle state or a connected state. Before the AMF reselection, a policy association is established between the old AMF and the old PCF. A corresponding resource is created on the old PCF, and a URI1 of the resource may be, for example, {apiRoot1}/npcf-am-policy-control/v1/policies/policyId1. The resource may include, for example, a policy provided by the old PCF for the terminal, and location information of the terminal that is provided by the old AMF to the PCF.

The following describes the policy control method of this application using an AMF reselection procedure in a registration procedure as an example. For other procedures, for example, an AMF reselection procedure in a handover procedure, refer to the policy control method in the AMF reselection procedure in a registration procedure. No further details are described herein.

The method may include the following steps.

Step 1 to step 5 are the same as step 1 to step 5 in the embodiment shown in FIG. 6. Refer to the foregoing descriptions, and details are not described herein again.

Step 6 is the same as step 7 in the embodiment shown in FIG. 6. Refer to the foregoing descriptions, and details are not described herein again.

Then, in one circumstance, if the new AMF selects to use the old PCF, step 7a, step 7c, and step 8 are performed. If the new AMF selects not to use the old PCF, and selects to use the new PCF instead, step 7b, step 7c, and step 8 are performed.

Step 7a is the same as step 8a in the embodiment shown in FIG. 6. Refer to the foregoing descriptions, and details are not described herein again.

Step 7b is the same as step 9 in the embodiment shown in FIG. 6. Refer to the foregoing descriptions, and details are not described herein again.

Step 7c. The old AMF sends a deletion request message to the old PCF. For example, the deletion request message may be an Npcf_AMPolicyControl_Delete Request message. The deletion request message is used to request deletion of the information of the policy association previously established between the old AMF and the old PCF. Accordingly, the old PCF may receive the deletion request message.

In one circumstance, if the new AMF selects the old PCF, step 7a is performed. However, because step 7a and step 7c are possibly concurrent, there is no definite order of execution. If step 7a has already been performed when step 7c is performed, the old PCF ignores the request message, that is, skips deletion of the policy association. If step 7a has not been performed when step 7c is performed, the old PCF waits for a period of time (that is, starts a timer) according to a configuration. If step 7a is performed before the timer expires, the old PCF ignores the request message, that is, skips deletion of the policy association. If step 7a is not performed yet before the timer expires, the old PCF deletes the information of the policy association. After the old PCF deletes the information of the policy association, the old PCF sends a deletion response message to the old AMF. Accordingly, the old AMF may receive the deletion response message.

In another circumstance, if the new AMF does not select the old PCF, the new AMF does not perform step 7a. Therefore, after step 7c is performed, the old PCF waits for a period of time (that is, starts the timer) according to a configuration, and step 7a is not to be performed when the timer expires. Therefore, the old PCF deletes the information of the policy association when the timer expires. After the old PCF deletes the information of the policy association, the old PCF sends a deletion response message to the old AMF. Accordingly, the old AMF may receive the deletion response message.

In another implementation, the deletion request message in step 7c may carry a deletion indication. If in step 7c, for an AMF reselection scenario, the deletion request message must carry a deletion indication, and the old PCF does not start the timer until receiving a deletion request message carrying a deletion indication. If step 7a is performed before the timer expires, the old PCF ignores the request message. If step 7a is not performed yet when the timer expires, the old PCF performs a deletion operation. In this implementation, the old PCF does not start the timer in response to a deletion indication until determining that the deletion request message carries the deletion indication. If the deletion request message does not carry any deletion indication, the old PCF may consider this as a normal deletion request, and therefore, may directly delete the information of the policy association. For example, for a deletion request message sent to the old PCF in a terminal deregistration procedure, after the old PCF receives the deletion request message, the old PCF may immediately delete the information of the policy association because no deletion indication is present in the deletion request message.

In a specific implementation, the deletion indication may be a specific indication or an AMF reselection indication. For example, the specific implementation may be the old AMF sends an HTTP Delete message to the old PCF, where a requested URL4 is {apiRoot1}/npcf-am-policy-control/v1/policies/policyId1. The message body may carry a deletion indication. If step 7a has already been performed when step 7c is performed, the old PCF ignores the request message, that is, skips deletion of the information of the policy association. If step 7a has not been performed when step 7c is performed, the old PCF waits for a period of time (that is, starts a timer) according to a configuration. If step 7a is performed before the timer expires, the old PCF ignores the request message, that is, skips deletion of the information of the policy association. If step 7a is still not performed when the timer expires, a resource corresponding to the URL4 is deleted. If in step 7c, for an AMF reselection scenario, a deletion request must carry a deletion indication, and the old PCF does not start the timer until receiving a deletion request message carrying a deletion indication. If step 7a is performed before the timer expires, the old PCF ignores the request message. If step 7a is not performed yet when the timer expires, the old PCF performs delete the information of the policy association, and deletes the resource corresponding to URL4. Then, the old PCF returns an HTTP Response message to the old AMF.

Step 8. The new AMF sends a registration accept message to the terminal. Accordingly, the terminal may receive the registration accept message.

The solutions provided by this application are described above mainly from a perspective of interaction between the network elements. It may be understood that, the network elements include corresponding hardware structures and/or software modules for performing the foregoing functions. A person skilled in the art should be easily aware that, the units and algorithm steps in the examples described with reference to the embodiments disclosed in this specification may be implemented by hardware or a combination of hardware and computer software. Whether a function is implemented by hardware or by computer software driving hardware depends on particular applications and design constraints of the technical solution. A person skilled in the art may use a different method to implement the described functions for each particular application, but it should not be considered that the implementation goes beyond the scope of the present disclosure.

Figure 8:
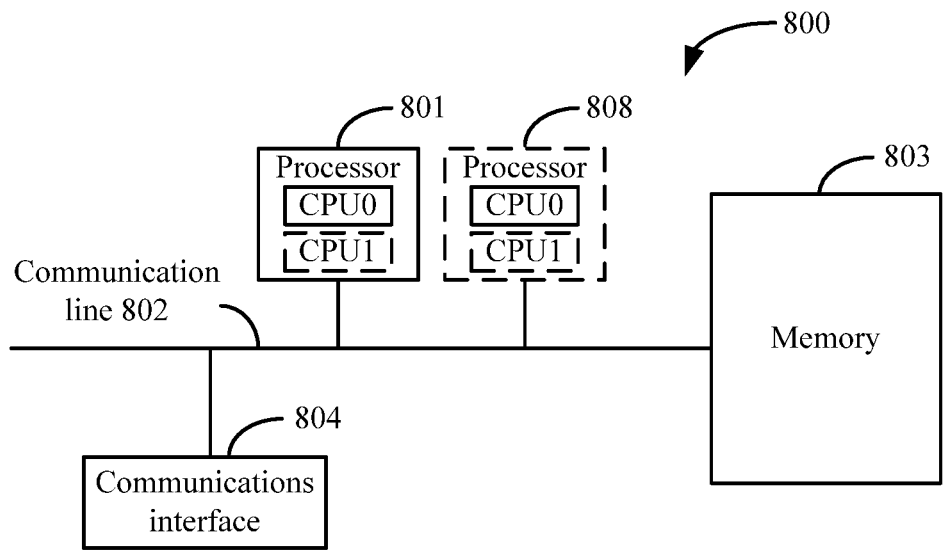
FIG. 8 is a schematic diagram of an apparatus according to this application.

Based on the same idea, FIG. 8 is a schematic diagram of an apparatus according to this application. The apparatus may be a mobility management network element, a policy control network element, or a chip, and can perform the method in any of the foregoing embodiments. When the apparatus is a policy control network element or a chip, the apparatus 800 may be configured to perform the operations performed by the PCF in the embodiments shown in FIG. 2 to FIG. 7. When the apparatus is a mobility management network element or a chip, the apparatus 800 may be configured to perform the operations performed by the first AMF or the second AMF in the embodiments shown in FIG. 2 to FIG. 7.

The apparatus 800 includes at least one processor 801, a communication line 802, a memory 803, and at least one communications interface 804.

The processor 801 may be a general-purpose central processing unit (CPU), a microprocessor, an application-specific integrated circuit (ASIC), or one or more integrated circuits configured to control execution of a program of the solution of this application.

The communication line 802 may include a path and transfers information between the foregoing components.

The communications interface 804 is configured to communicate, using any apparatus such as a transceiver, with another device or a communications network, for example, an Ethernet, a RAN, a wireless local area network (WLAN), or a wired access network.

The memory 803 may be a read-only memory (ROM) or other types of static storage devices that can store static information and instructions, or a random access memory (RAM) or other types of dynamic storage devices that can store information and instructions, or may be an electrically erasable programmable read-only memory (EEPROM), a compact disc read-only memory (CD-ROM) or other compact disc memories, an optical disc storage (including a compact disc, a laser disc, an optical disc, a digital versatile disc, a BLU-RAY disc, and the like), a disk storage medium or other magnetic storage devices, or any other media that can be used to carry or store expected program code in a form of instructions or a data structures and that can be accessed by a computer. The memory is not limited thereto though. The memory may stand alone and is connected to the processor through the communication line 802. The memory may also be integrated with the processor.

The memory 803 is configured to store computer-executable instructions for executing the solution of this application, and the processor 801 controls execution of the computer-executable instructions. The processor 801 is configured to execute the computer-executable instructions stored in the memory 803 in order to implement the policy control method according to the foregoing embodiments.

Optionally, the computer-executable instruction in this embodiment of this application may be alternatively referred to as application program code. This is not limited in this embodiment of this application.

In specific implementation, in one embodiment, the processor 801 may include one or more CPUs, for example, a CPU0 and a CPU1 in FIG. 8.

In specific implementation, in one embodiment, the apparatus 800 may include a plurality of processors, for example, the processor 801 and a processor 808 in FIG. 8. Each of these processors may be a single-core (single-CPU) processor, or a multi-core (multi-CPU) processor. The processor herein may be one or more devices, circuits, and/or processing cores used to process data (for example, computer program instructions).

When the apparatus shown in FIG. 8 is a chip, for example, a chip of a first mobility management network element, a chip of a second mobility management network element, or a chip of a policy control network element, the chip includes a processor 801 (may further include a processor 808), a communication line 802, a memory 803, and a communications interface 804. The communications interface 804 may be an input interface, a pin, a circuit, or the like. The memory 803 may be a register, a buffer, or the like. The processor 801 and the processor 808 may be a general-purpose CPU, a microprocessor, an ASIC, or one or more integrated circuits configured to control execution of a program of the policy control method of any one of the foregoing embodiments.

Figure 9:
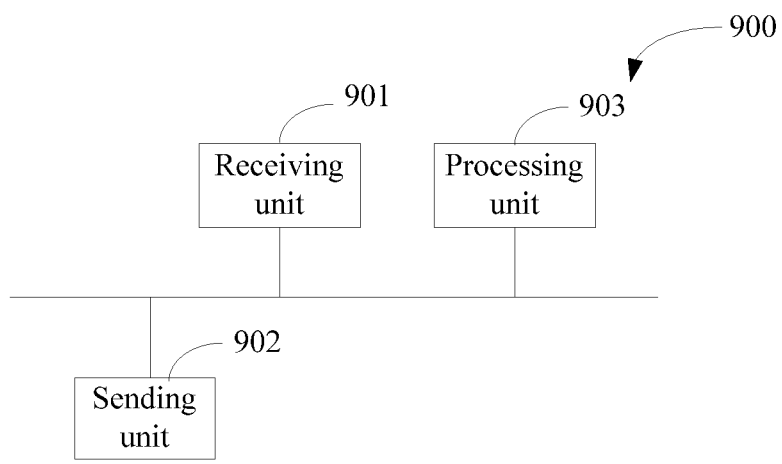
FIG. 9 is a schematic diagram of another apparatus according to this application.

In this application, functional modules in the apparatus may be obtained through division based on the foregoing method examples. For example, the functional modules may be obtained thought division in correspondence to functions, or two or more functions may be integrated in one processing module. The integrated module may be implemented in a form of hardware, or may be implemented in a form of a functional module of software. It should be noted that, the module division in this application is merely an example, and is only division corresponding to logical functions. Other division manners may be available in an embodiment. For example, when the functional modules are obtained thought division in correspondence to functions, FIG. 9 shows a schematic diagram of an apparatus. The apparatus 900 may be the first mobility management network element in the foregoing embodiments, the second mobility management network element in the foregoing embodiments, the policy control network element in the foregoing embodiments, a chip in the first mobility management network element, a chip in the second mobility management network element, or a chip in the policy control network element. The apparatus 900 includes a receiving unit 901, a sending unit 902, and a processing unit 903.

In an embodiment, when the apparatus 900 is the first mobility management network element in the foregoing embodiments or a chip in the first mobility management network element, the receiving unit 901 is configured to receive a context of a terminal from a second mobility management network element, where the context of the terminal includes information of a policy association corresponding to the terminal, and the information of the policy association includes an identifier of a policy control network element, the processing unit 903 is configured to select the policy control network element, and the sending unit 902 is configured to send an update request message to the policy control network element, where the update request message includes information about the first mobility management network element, and the update request message is used to request the policy control network element to update information about the second mobility management network element in the information of the policy association to the information about the first mobility management network element.

In a possible implementation, the information about the first mobility management network element includes at least one of the following information an identifier of the first mobility management network element, an address of the first mobility management network element for receiving a policy update, a current subscription policy of the terminal, and current access information of the terminal.

In a possible implementation, the update request message further includes a mobility management network element change indication.

In a possible implementation, the information of the policy association included in the context of the terminal that is obtained by the first mobility management network element from the second mobility management network element, further includes an identifier of a resource that is created by the policy control network element and that corresponds to the policy association, the update request message further includes the identifier of the resource, and the update request message is used to request updating of the information about the second mobility management network element in the resource to the information about the first mobility management network element.

In a possible implementation, the policy association is established for the terminal by the second mobility management network element or a third mobility management network element.

In another embodiment, when the apparatus 900 is the second mobility management network element in the foregoing embodiments or a chip in the second mobility management network element, the receiving unit 901 is configured to receive a request message from a first mobility management network element, where the request message is used to request a context of a terminal, and the sending unit 902 may be configured to send the context of the terminal to the first mobility management network element, where the context of the terminal includes information of a policy association corresponding to the terminal, and the information of the policy association includes an identifier of the policy control network element.

In a possible implementation, the processing unit 903 is configured to start a timer. The sending unit 902 is further configured to, when the timer expires and the receiving unit 901 has not received any notification message sent by the policy control network element, send a first deletion request message to the policy control network element, where the notification message is used to notify that the policy control network element has received a request message sent by the first mobility management network element for updating the policy association, and the first deletion request message is used to request the policy control network element to delete the policy association.

In a possible implementation, the sending unit 902 is further configured to send a second deletion request message to the policy control network element, where the second deletion request message includes a deletion indication, and the deletion indication is used to indicate the policy control network element to delete the policy association when no request message for updating the policy association is received.

In a possible implementation, the sending unit 902 is further configured to send a third deletion request message to the policy control network element, where the third deletion request message includes a mobility management network element change indication, and the mobility management network element change indication is used to indicate that the deletion request message is triggered by a mobility management network element change.

In a possible implementation, the information of the policy association further includes an identifier of a resource that is created by the policy control network element and that corresponds to the policy association.

In a possible implementation, the policy association is established for the terminal by the second mobility management network element or a third mobility management network element.

In another embodiment, when the apparatus 900 is the policy control network element in the foregoing embodiments or a chip for policy control, the receiving unit 901 is configured to receive an update request message from a first mobility management network element, where the update request message includes information about the first mobility management network element, and the processing unit 903 is configured to update, according to the update request message, information about a second mobility management network element in information of a policy association corresponding to a terminal to the information about the first mobility management network element.

In a possible implementation, the receiving unit 901 is further configured to, before receiving the update request message, receive a deletion request message from the second mobility management network element, where the deletion request message is used to request deletion of the policy association, and the processing unit 903 is further configured to start a timer. Accordingly, the receiving unit 901 is configured to, before the timer expires, receive the update request message from the first mobility management network element.

In a possible implementation, the receiving unit 901 is further configured to, after receiving the update request message, receive a deletion request message from the second mobility management network element, where the deletion request message is used to request deletion of the policy association, and the processing unit 903 is further configured to ignore the deletion request message.

In a possible implementation, the deletion request message includes a deletion indication, and the deletion indication is used to indicate the apparatus to delete the policy association when no request message for updating the policy association is received. That the processing unit 903 is further configured to start a timer includes starting the timer in response to the deletion indication.

In a possible implementation, the deletion request message includes a mobility management network element change indication, and the mobility management network element change indication is used to indicate that the deletion request message is triggered by a mobility management network element change. That the processing unit 903 is further configured to start a timer includes starting the timer in response to the mobility management network element change indication.

In a possible implementation, the sending unit 902 is configured to send a notification message to the second mobility management network element, where the notification message is used to notify that the apparatus has received the update request message.

In a possible implementation, the information about the first mobility management network element includes at least one of the following information an identifier of the first mobility management network element, an address of the first mobility management network element for receiving a policy update, a current subscription policy of the terminal, and current access information of the terminal.

In a possible implementation, the update request message further includes a mobility management network element change indication.

In a possible implementation, the policy association is established for the terminal by the second mobility management network element or a third mobility management network element.

In another embodiment, when the apparatus 900 is the policy control network element in the foregoing embodiments or a chip in the policy control network element, the receiving unit 901 is configured to receive a deletion request message from a second mobility management network element, where the deletion request message is used to request the apparatus to delete a policy association corresponding to a terminal, and the processing unit 903 is configured to start a timer, and is further configured to, if the timer expires and the receiving unit 901 has not received an update request message from a first mobility management network element, delete the policy association. The update request message includes information about the first mobility management network element, and the update request message is used to request the apparatus to update information about the second mobility management network element in information of the policy association to the information about the first mobility management network element.

In a possible implementation, the deletion request message includes a deletion indication, and the deletion indication is used to indicate the apparatus to delete the policy association when no request message for updating the policy association is received. That the processing unit 903 starts a timer includes starting the timer in response to the deletion indication.

In a possible implementation, the second deletion request message includes a mobility management network element change indication, and the mobility management network element change indication is used to indicate that the deletion request message is triggered by a mobility management network element change. That the processing unit 903 starts a timer includes starting the timer in response to the mobility management network element change indication.

In a possible implementation, the policy association is established for the terminal by the second mobility management network element or a third mobility management network element.

It should be understood that the apparatus can be configured to implement the steps performed by the first mobility management network element, the second mobility management network element, where the policy control network element in the method in the embodiments of the present disclosure. For related features, refer to the foregoing descriptions, and details are not described herein again.

In an embodiment, functions/implementation processes of the receiving unit 901, the processing unit 903, and the sending unit 902 in FIG. 9 may be implemented by the processor 801 in FIG. 8 by invoking the computer-executable instructions stored in the memory 803. Alternatively, functions/implementation processes of the processing unit 903 in FIG. 9 may be implemented by the processor 801 in FIG. 8 by invoking the computer-executable instructions stored in the memory 803, and functions/implementation processes of the receiving unit 901 and the sending unit 902 in FIG. 9 may be implemented by the communications interface 804 in FIG. 8.

Optionally, when the apparatus 900 is a chip or a circuit, the functions/implementation processes of the receiving unit 901 and the sending unit 902 may be implemented by pins, circuits, or the like. Optionally, when the apparatus 800 is a chip, the memory 803 may be a storage unit in the chip, for example a register or a cache. Certainly, when the apparatus 800 is a mobility management network element, such as the first mobility management network element or the second mobility management network element in the foregoing embodiments, the memory 803 may be a storage unit located outside a chip in the mobility management network element. This is not limited in this embodiment of this application. When the apparatus 800 is a policy control network element, the memory 803 may be a storage unit located outside a chip in the policy control network element. This is not limited in this embodiment of this application.

This application further provides a system. The system includes the policy control network element and the first mobility management network element in the embodiment shown in FIG. 2 or FIG. 5. Further, the system may further include the second mobility management network element in the embodiment shown in FIG. 2 or FIG. 5.

This application further provides another system. The system includes the policy control network element and the first mobility management network element in the embodiment shown in FIG. 3 or FIG. 6. Further, the system may further include the second mobility management network element in the embodiment shown in FIG. 3 or FIG. 6.

This application further provides another system. The system includes the policy control network element and the first mobility management network element in the embodiment shown in FIG. 4 or FIG. 7. Further, the system may further include the second mobility management network element in the embodiment shown in FIG. 4 or FIG. 7.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, through a coaxial cable, an optical fiber, or a digital subscriber line (DSL)) or wireless (for example, through infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The various illustrative logical units and circuits described in the embodiments of this application may implement or operate the described functions using a general-purpose processor, a digital signal processor, an ASIC, a field programmable gate array (FPGA) or other programmable logical apparatuses, a discrete gate or transistor logic, a discrete hardware component, or a design of any combination thereof. The general-purpose processor may be a microprocessor. Alternatively, the general-purpose processor may be any conventional processor, controller, microcontroller, or state machine. The processor may be alternatively implemented by a combination of computing apparatuses, for example, a digital signal processor and a microprocessor, a plurality of microprocessors, one or more microprocessors in combination with a digital signal processor core, or any other similar configurations.

Steps of the methods or algorithms described in the embodiments of this application may be directly embedded into hardware, a processor-executed software unit, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other forms in the art. For example, the storage medium may be connected to the processor such that the processor can read information from the storage medium and write information to the storage medium. Alternatively, the storage medium may be integrated into the processor. The processor and the storage medium may be provided in an ASIC, and the ASIC may be provided in a terminal device. Alternatively, the processor and the storage medium may be distributed in different components of a terminal device.

These computer program instructions may alternatively be loaded onto a computer or other programmable data processing devices such that a series of operations and steps are performed on the computer or the other programmable devices, thereby generating computer-implemented processing. Therefore, the instructions executed on the computer or the other programmable devices provide steps for implementing specific functions in one or more processes in the flowcharts and/or in one or more blocks in the block diagrams.

Although the present disclosure is described with reference to specific features and the embodiments thereof, obviously, various modifications and combinations may be made to them without departing from the spirit and scope of the present disclosure. Correspondingly, the specification and accompanying drawings are merely illustrative descriptions of the present disclosure defined by the accompanying claims, and are considered to have covered any and all modifications, variations, combinations or equivalents within the scope of the present disclosure. Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A policy control method comprising:
receiving, by a first mobility management network element and from a second mobility management network element, a context of a terminal, wherein the context comprises first information of a policy association corresponding to the terminal, and wherein the first information comprises a first identifier of a policy control network element and a second identifier of a resource corresponding to the policy association;
selecting, by the first mobility management network element according to the first identifier, the policy control network element;
sending, by the first mobility management network element and to the policy control network element, an update request message comprising second information about the first mobility management network element and comprising the second identifier;
receiving, by the policy control network element and from the first mobility management network element, the update request message; and
updating, by the policy control network element according to the update request message, third information to the second information,
wherein the third information is about the second mobility management network element and corresponds to the second identifier.

2. The method of claim 1, wherein the first information comprises a third identifier of a policy control function (PCF).

3. The method of claim 1, wherein the second information comprises an address of the first mobility management network element to receive a policy update, a current subscription policy of the terminal, or current access information of the terminal.

4. The method of claim 1, wherein the second mobility management network element establishes the policy association for the terminal.

5. The method of claim 1, wherein a third mobility management network element establishes the policy association for the terminal.

6. The method of claim 1, wherein the update request message carries an access and mobility management function change indication.

7. The method of claim 1, further comprising:
sending, by the first mobility management network element, to the second mobility management network element, a first indication indicating that the first information is not used by the first mobility management network element;
receiving, by the second mobility management network element, the first indication; and
deleting, by the second mobility management network element in response to the first indication, the policy association corresponding to the terminal.

8. A system comprising:
a policy control network element; and
a first mobility management network element configured to:
receive, from a second mobility management network element, a context of a terminal, wherein the context comprises first information of a policy association corresponding to the terminal, and wherein the first information comprises a first identifier of the policy control network element and a second identifier of a resource corresponding to the policy association;
select, according to the first identifier, the policy control network element; and
send, to the policy control network element, an update request message comprising second information about the first mobility management network element and comprising the second identifier,
wherein the policy control network element is configured to:
receive, from the first mobility management network element, the update request message; and
update, according to the update request message, third information to the second information,
wherein the third information is about the second mobility management network element and corresponds to the second identifier.

9. The system of claim 8, wherein the resource comprises the third information.

10. The system of claim 8, wherein the second information comprises an address of the first mobility management network element to receive a policy update, a current subscription policy of the terminal, or current access information of the terminal.

11. The system of claim 8, wherein the second mobility management network element establishes the policy association for the terminal.

12. The system of claim 8, wherein a third mobility management network element establishes the policy association for the terminal.

13. The system of claim 8, wherein the update request message carries an access and mobility management function change indication.

14. The system of claim 8, further comprising the second mobility management network element, wherein the first mobility management network element is further configured to send, to the second mobility management network element, a first indication indicating that the first information is not used by the first mobility management network element, and wherein the second mobility management network element is configured to:
receive the first indication; and
delete, in response to the first indication, the policy association corresponding to the terminal.

15. A first mobility management network element comprising:
a memory configured to store instructions; and
a processor coupled to the memory and configured to execute the instructions to cause the first mobility management network element to:
receive, from a second mobility management network element, a context of a terminal, wherein the context comprises first information of a policy association corresponding to the terminal, and wherein the first information comprises a first identifier of a policy control network element and a second identifier of a resource corresponding to the policy association;
select, according to the first identifier, the policy control network element; and
send to the policy control network element, an update request message comprising second information about the first mobility management network element, comprising the second identifier, and requesting the policy control network element to update third information to the second information,
wherein the third information is about the second mobility management network element and corresponds to the second identifier.

16. The first mobility management network element of claim 15, wherein the resource comprises the third information.

17. The first mobility management network element of claim 15, wherein the second mobility management network element or a third mobility management network element establishes the policy association for the terminal.

18. The first mobility management network element of claim 15, wherein the second information comprises an address of the first mobility management network element to receive a policy update, a current subscription policy of the terminal, or current access information of the terminal.

19. The first mobility management network element of claim 15, wherein the update request message carries an access and mobility management function change indication.

20. The first mobility management network element of claim 15, wherein the processor is further configured to execute the instructions to cause the first mobility management network element to send, to the second mobility management network element, a first indication indicating that the first information is not used by the first mobility management network element.

21. A method implemented by a first mobility management network element and comprising:
receiving, from a second mobility management network element, a context of a terminal, wherein the context comprises first information of a policy association corresponding to the terminal, and wherein the first information comprises a first identifier of a policy control network element and a second identifier of a resource corresponding to the policy association;
selecting, according to the first identifier, the policy control network element; and
sending, to the policy control network element, an update request message comprising second information about the first mobility management network element, comprising the second identifier, and requesting the policy control network element to update third information to the second information,
wherein the third information is about the second mobility management network element and corresponds to the second identifier.

22. The method of claim 21, wherein the resource comprises the third information.

23. The method of claim 21, wherein the second information comprises an address of the first mobility management network element to receive a policy update, a current subscription policy of the terminal, or current access information of the terminal.

24. The method of claim 21, further comprising sending, to the second mobility management network element, a first indication indicating that the first information is not used by the first mobility management network element.

* * * * *

UNITED STATES PATENT AND TRADEMARK OFFICE
CERTIFICATE OF CORRECTION

PATENT NO. : 11,463,921 B2
APPLICATION NO. : 17/009212
DATED : October 4, 2022
INVENTOR(S) : Zaifeng Zong and Shufeng Shi It is certified that error appears in the above-identified patent and that said Letters Patent is hereby corrected as shown below:

In the Claims

Claim 2, Column 33, Line 60: "wherein the first information" should read "wherein the resource"

Claim 2, Column 33, Lines 61 and 62: "comprises a third identifier of a policy control function (PCF)" should read "comprises the third information"

Signed and Sealed this
Twentieth Day of December, 2022

Katherine Kelly Vidal
*Director of the United States Patent and Trademark Office*